United States Patent
Ito et al.

(10) Patent No.: US 8,256,962 B2
(45) Date of Patent: Sep. 4, 2012

(54) FLUID DYNAMIC BEARING DEVICE

(75) Inventors: Kenji Ito, Kuwana (JP); Isao Komori, Kuwana (JP); Fuminori Satoji, Kuwana (JP); Fuyuki Ito, Kuwana (JP); Yoshiharu Inazuka, Kuwana (JP)

(73) Assignee: NTN Corporation, Osaka-shi (JP)

( * ) Notice: Subject to any disclaimer, the term of this patent is extended or adjusted under 35 U.S.C. 154(b) by 779 days.

(21) Appl. No.: 11/910,316

(22) PCT Filed: Apr. 17, 2006

(86) PCT No.: PCT/JP2006/308072
§ 371 (c)(1),
(2), (4) Date: Jan. 29, 2009

(87) PCT Pub. No.: WO2006/115104
PCT Pub. Date: Nov. 2, 2006

(65) Prior Publication Data
US 2009/0129710 A1     May 21, 2009

(30) Foreign Application Priority Data

Apr. 19, 2005 (JP) ................................. 2005-121253
Apr. 19, 2005 (JP) ................................. 2005-121256
Jul. 20, 2005 (JP) ................................. 2005-210335

(51) Int. Cl.
*F16C 32/06* (2006.01)
(52) U.S. Cl. ..................................................... 384/107
(58) Field of Classification Search .................. 384/100, 384/107, 114, 119
See application file for complete search history.

(56) References Cited

U.S. PATENT DOCUMENTS 4,254,961 A * 3/1981 Fersht et al. .................. 384/100
5,941,644 A * 8/1999 Takahashi ..................... 384/112
(Continued)

FOREIGN PATENT DOCUMENTS

CN     1450281 A     10/2003
(Continued)

OTHER PUBLICATIONS

International Search Report of PCT/JP2006/308072, date of mailing Jul. 25, 2006.

(Continued)

*Primary Examiner* — Thomas R Hannon
(74) *Attorney, Agent, or Firm* — Westerman, Hattori, Daniels & Adrian, LLP

(57) ABSTRACT

The present invention aims to achieve a reduction in cost for a fluid dynamic bearing device. The fluid dynamic bearing device supports a shaft member (2) radially in a non-contact fashion by a dynamic pressure action generated in a radial bearing gap between an outer peripheral surface of the shaft member (2) and an inner peripheral surface (7a) of a bearing member (7), and is composed of the shaft member (2), the bearing member (7), a cover member (8), and a seal member (9). The shaft member (2) is inserted into an inner periphery of the bearing member (7), and an opening at a lower end thereof is sealed by the cover member (8). The seal member (9) is attached to an opening at an upper end of the bearing member (7), forming a seal space (S) between itself and the outer peripheral surface of the shaft member (2). Dynamic pressure grooves (G) of radial bearing portions (R1 and R2) are formed in an inner peripheral surface (7a) of the bearing member (7) by molding.

12 Claims, 12 Drawing Sheets

U.S. PATENT DOCUMENTS

| | | | |
|---|---|---|---|
| 6,412,984 B2 * | 7/2002 | Asai et al. | 384/107 |
| 7,431,506 B2 * | 10/2008 | Huang et al. | 384/114 |
| 2003/0133633 A1 * | 7/2003 | Nakamura | 384/107 |
| 2004/0013329 A1 | 1/2004 | Yamashita et al. | |
| 2004/0091188 A1 * | 5/2004 | Aiello et al. | 384/119 |
| 2004/0165797 A1 * | 8/2004 | Oku et al. | 384/119 |
| 2005/0232522 A1 * | 10/2005 | Yamamoto | 384/100 |
| 2005/0286820 A1 * | 12/2005 | Grantz et al. | 384/119 |
| 2006/0274448 A1 | 12/2006 | Asada et al. | |
| 2008/0304776 A1 | 12/2008 | Asada et al. | |

FOREIGN PATENT DOCUMENTS

| | | |
|---|---|---|
| JP | 6-042361 A | 2/1994 |
| JP | 9-112543 A | 5/1997 |
| JP | 2003148498 A | 5/2003 |
| JP | 2004-316925 A | 11/2004 |
| JP | 2004316925 A | 11/2004 |
| WO | WO 2004/094848 A1 | 11/2004 |

OTHER PUBLICATIONS

Japanese Office Action dated Sep. 12, 2011, issued in corresponding Japanese Patent Application No. 2005-121253.(w/partial English translation).

Chinese Office Action dated Mar. 20, 2009, issued in corresponding Chinese Patent Application No. 200680012735.X.

* cited by examiner

FLUID DYNAMIC BEARING DEVICE

TECHNICAL FIELD

The present invention relates to a fluid dynamic bearing device.

BACKGROUND ART

A fluid dynamic bearing device is a bearing device in which pressure is generated by a dynamic pressure action of a fluid generated in a bearing gap through relative rotation of a bearing member and a shaft member inserted into the inner periphery of the bearing member and which supports the shaft member in a non-contact fashion with this pressure. The fluid dynamic bearing device is endowed with various features such as high speed rotation, high rotational accuracy, and low noise, and is suitable as a bearing device for use in a spindle motor for a disk drive in an information apparatus, for example, a magnetic disk device such as an HDD, an optical disk device such as a CD-ROM, a CD-R/RW, or a DVD-ROM/RAM, or a magneto-optical disk device such as an MD or MO, a polygon scanner motor for a laser beam printer (LBP), a projector color wheel motor, or a small motor for an axial fan or the like.

For example, as shown in FIG. 19, in a fluid dynamic bearing device to be incorporated into the spindle motor of a disk drive apparatus such as an HDD, there are provided a radial bearing portion R supporting a shaft member 20 radially in a non-contact fashion and a thrust bearing portion T supporting the shaft member in a thrust direction in a non-contact fashion. As a bearing for the radial bearing portion R, there is a publicly known fluid dynamic bearing provided with grooves (i.e., dynamic pressure grooves) for dynamic pressure generation provided in an inner peripheral surface of a bearing sleeve 80 which is formed in cylindrical shape. As the thrust bearing portion T, there is a publicly known fluid dynamic bearing provided with dynamic pressure grooves in, for example, both end surfaces of a flange portion 20b of the shaft member 20 or in surfaces opposed thereto (e.g., an end surface 81 of the bearing sleeve 80 and an end surface 61a of a roof member 61 fixed to a lower portion of the housing 70) (see, for example, Patent Documents 1 and 2).

In many cases, in a fluid dynamic bearing device of this type, the bearing sleeve 80 is usually fixed to a predetermined position of the inner periphery of the housing 70, and there is provided a seal member 90 at the opening of the housing 70 in order to prevent lubricant supplied into the inner space of the housing 70 from leaking to the exterior.

[Patent Document 1] JP 2003-65324 A
[Patent Document 2] JP 2003-336636 A

DISCLOSURE OF THE INVENTION

Problem to be Solved by the Invention

As described above, in the fluid dynamic bearing device shown in FIG. 19, the construction is adopted in which the bearing sleeve is fixed to the inner peripheral surface of the housing, so it is necessary to perform a bonding step, etc. for fixing them to each other, resulting in a complicated assembly process. In particular, the fixation accuracy in the axial direction of the bearing sleeve with respect to the housing also influences the width accuracy of the thrust bearing gap in the thrust bearing portion, so the fixation must be effected carefully, resulting in a further increase in cost.

It is accordingly an object of the present invention to achieve a reduction in cost for a fluid dynamic bearing device.

Means for Solving the Problem

To achieve the above-mentioned object, a fluid dynamic bearing device according to the present invention is characterized by including: a shaft member; a bearing member in an inner periphery of which the shaft member is inserted and which has on an outer peripheral surface thereof a fixing surface for fixation to a bracket; a radial bearing portion radially supporting the shaft member by a dynamic pressure action of a lubricant fluid generated in a radial bearing gap between an outer peripheral surface of the shaft member and an inner peripheral surface of the bearing member; a thrust bearing portion supporting the shaft member in a thrust direction; and a dynamic pressure generating portion which is formed by molding in the inner peripheral surface of the bearing member facing the radial bearing gap and which generates the dynamic pressure action of the lubricant fluid in the radial bearing gap.

In this way, the bearing member is equipped with a fixing surface for fixation to a bracket (for example, a bracket having a stator coil mounting portion). Further, between the inner peripheral surface of the bearing member and the outer peripheral surface of the shaft member opposed thereto, there is formed a radial bearing gap generating a dynamic pressure action of a lubricant fluid (lubricating oil, magnetic fluid, air, etc.). Thus, the bearing member of the present invention corresponds to a construction in which, in the conventional example shown in FIG. 19, the housing 70 and the bearing sleeve 80 are integrated with each other. As a result, it is possible to omit the step of fixing the housing and the bearing sleeve to each other, and to achieve a reduction in cost for the fluid dynamic bearing device through a reduction in the number of components. Further, the fixation accuracy of the bearing sleeve with respect to the housing does not influence the width of the thrust bearing gap of the thrust bearing portion as in the prior art, thus facilitating the width control of the thrust bearing gap.

From the viewpoint of cost, it is desirable for the bearing member to be formed by injection molding of resin, metal, etc. In injection molding, the dynamic pressure generating portion of the radial bearing portion can be formed simultaneously with the molding of the bearing member by using a mold having a molding portion in conformity with the configuration thereof, thereby achieving a further reduction in cost for the fluid dynamic bearing device.

At the opening of the bearing member, it is possible to form a seal space by a seal member. This seal space can be formed not only in the inner periphery of the seal member but also in the outer periphery of the seal member. The former is suitable for a construction in which the seal member is fixed to the bearing member; in this case, the seal space is formed, for example, between the inner peripheral surface of the seal member and the outer peripheral surface of the shaft member. The latter is suitable for a construction in which the seal member is fixed to the shaft member; in this case, the seal space is formed, for example, between the outer peripheral surface of the seal member and the inner peripheral surface of the bearing member.

Further, a fluid dynamic bearing device according to the present invention is characterized by including: a shaft member; a bearing member which is provided with a small diameter inner peripheral surface and a large diameter inner peripheral surface, with the small diameter inner peripheral surface being opposed to an outer peripheral surface of the shaft member through an intermediation of a radial bearing gap, and which has on an outer peripheral surface thereof a fixing surface for fixation to a bracket; a seal member provided with an outer peripheral surface opposed to the large diameter inner peripheral surface of the bearing member and forming a seal space at an opening of the bearing member; a radial bearing portion radially supporting the shaft member by a dynamic pressure action of a lubricating oil generated in the radial bearing gap; and a thrust bearing portion supporting the shaft member in a thrust direction.

In this construction also, the bearing member is equipped with a fixing surface for fixation to a bracket (in particular, a bracket having a stator coil mounting portion). Further, between the small diameter inner peripheral surface of the bearing member and the outer peripheral surface of the shaft member opposed thereto, there is formed a radial bearing gap generating a dynamic pressure action of a lubricant fluid (lubricating oil, magnetic fluid, air, etc.). Thus, the bearing member of the present invention corresponds to a construction in which, in the conventional example shown in FIG. 19, the housing 70 and the bearing sleeve 80 are integrated with each other. As a result, it is possible to omit the step of fixing the housing and the bearing sleeve to each other, and to achieve a reduction in cost for the fluid dynamic bearing device through a reduction in the number of components. Further, the fixation accuracy of the bearing sleeve with respect to the housing does not influence the width of the thrust bearing gap of the thrust bearing portion as in the prior art, thus facilitating the width control of the thrust bearing gap.

In this case, the seal space can be formed not only in the inner periphery of the seal member but also in the outer periphery of the seal member. The former is suitable for a construction in which the seal member is fixed to the bearing member; in this case, the seal space is formed, for example, between the inner peripheral surface of the seal member and the outer peripheral surface of the shaft member. The latter is suitable for a construction in which the seal member is fixed to the shaft member; in this case, the seal space is formed, for example, between the outer peripheral surface of the seal member and the large diameter inner peripheral surface of the bearing member.

In any of the above-mentioned constructions, it is possible to realize axial engagement between an end surface of the bearing member and an end surface of the seal member. In this case, by engaging them with each other at the time of assembly, it is possible to enhance the positional accuracy for the seal member in the axial direction. For example, in the case in which, as shown in FIG. 19, the outer peripheral surface of the shaft member opposed to the seal space is tapered, if the positional accuracy for the seal member is insufficient, there is a fear of generating a variation in the volume of the seal space. The seal space has a function (buffer function) to absorb a change in volume caused by a change in the temperature of the lubricant filling the inner space of the fluid dynamic bearing device, so a variation in the volume of the seal space can lead to oil leakage, etc. In contrast, in the present invention, high positional accuracy is attained also for the seal member through engagement with the end surface of the shaft member, so it is possible to clear away such fear.

During operation of the fluid dynamic bearing device, negative pressure can be locally generated in the space in the bearing device filled with lubricant fluid due to the influence of machining errors, etc. This negative pressure generation is undesirable since it leads to problems such as generation of bubbles in the lubricant fluid and generation of a vibration due to the generation of bubbles.

In this connection, by providing a fluid flow path extending through the bearing member and establishing communication between the bearing gap of the thrust bearing portion and the seal space, the lubricant fluid filling the bearing gap of the thrust bearing portion on the hermetically sealed side can circulate between the seal space on the side open to the atmosphere and the bearing gap of the radial bearing portion through the fluid flow path, so it is possible to prevent local generation of negative pressure, generation of bubbles resultant therefrom, etc. If, for some reason or another, bubbles are allowed to be mixed in the lubricant fluid, the bubbles are discharged into the atmosphere through the seal space when they circulate together with the lubricant fluid, so the adverse effect of the bubbles is avoided more effectively.

The fluid flow path, for example, has an axial portion whose one end is connected to the bearing gap (thrust bearing gap) of the thrust bearing portion and a radial portion formed between an end surface of the bearing member and an end surface of the seal member and establishing communication between the other end of the axial portion and the seal space.

The fluid flow path can be formed simultaneously with the molding of the bearing member (bearing sleeve) or by post-processing after the molding of the bearing member. However, generally speaking, the inner diameter dimension of the fluid flow path is minute (approximately several tens of µm to several hundreds of µm), so it is difficult to form it with high accuracy and in a stable manner.

The above-mentioned problem can be solved by enlarging the diameter of the fluid flow path. However, if the fluid flow path as a whole is simply enlarged in diameter, there is a fear of the strength of the bearing member being deteriorated. Further, as the fluid flow path increases in diameter, an excessive amount of fluid flows from another fluid retaining space into the fluid flow path, with the result that fluid escapes from a place where an increase in pressure should occur, or that there is a fear of a negative pressure state being locally generated. Thus, there rather is a possibility of the pressure balance inside the bearing being disturbed.

In the fluid dynamic bearing device of the present invention, to form a fluid flow path for attaining a proper pressure state within the bearing with high accuracy and in a stable manner, the bearing member is equipped with a fluid flow path open on both axial ends thereof and capable of effecting fluid circulation between both ends of the gap including the radial bearing gap between the outer peripheral surface of the shaft member and the inner peripheral surface of the bearing member, and the flow path area of the fluid flow path is varied in the axial direction thereof.

As described above, the present invention is characterized in that the flow path area of the fluid flow path provided in the bearing member is varied in the axial direction thereof. With this construction, in at least the region of the fluid flow path where the flow path area is enlarged, it is possible to improve the workability and moldability of the fluid flow path. Further, since the fluid retaining amount inside the bearing increases, it is possible to suppress a deterioration in the fluid. In addition, by providing the fluid flow path with a region whose flow path area is reduced, flowing of an excessive amount of fluid into the fluid flow path is avoided as much as possible, making it possible to keep a proper pressure balance inside the bearing.

The fluid flow path may be provided, for example, with a first flow path portion with a small flow path area and a second flow path portion whose flow path are is larger than that of the first flow path portion.

As a fluid dynamic bearing device having a fluid flow path as described above, a device may be employed which is further provided with a first thrust bearing portion for supporting rotatably and in the thrust direction at least one of the shaft member and the bearing member through the intermediation, for example, of a fluid film formed in the thrust bearing gap, and which has in a first thrust bearing portion a first dynamic pressure generating portion for generating a dynamic pressure action of the fluid in the thrust bearing gap. In this case, when the fluid flow path is open to the pressure generating region of the thrust bearing gap, pressure dissipation occurs through the opening, and there is a fear of the dynamic pressure effect of the dynamic pressure generating portion becoming rather insufficient. Thus, it is desirable for the fluid flow path to be open not on the first dynamic pressure generating portion but on the inner side or the outer side thereof.

In the case in which the fluid flow path is open on the outer side of the first dynamic pressure generating portion, in view of the requisite shaft diameter of the shaft member, it is rather difficult to enlarge the formation region for the first dynamic pressure generating portion to the inner side. In this case, by forming the opening of the fluid flow path as the first flow path portion with a small flow path area, it is possible to enlarge the region for the formation of the first dynamic pressure generating portion as much as possible to the outer side. Thus, the requisite area can be easily secured in the first dynamic pressure generating portion, thereby enhancing the degree of freedom in bearing design.

Apart therefrom, a construction may be employed which is further provided with a second thrust bearing portion supporting any one of the shaft member and the bearing member rotatably and in the thrust direction through the intermediation of a fluid film formed in the thrust bearing gap, and which has in the second thrust bearing portion a second dynamic pressure generating portion for generating a dynamic pressure action of the fluid in the thrust bearing gap.

In the above-mentioned construction, in opening the fluid flow path, the restriction in terms of dimension is less strict on the outer side of the bearing device than on the inner side thereof, so the formation region for the second dynamic pressure generating portion can be easily enlarged to the outer side. Thus, in the case in which the fluid flow path is opened on the inner side of the second dynamic pressure generating portion, it is possible to secure the formation region for the second dynamic pressure generating portion independently of the opening area. As a result, also in the case in which the opening is formed in the second flow path portion whose flow path area is larger than that of the first flow path portion, it is possible to avoid a reduction in the area of the second dynamic pressure generating portion attributable thereto, thereby further facilitating the bearing design.

The fluid flow path can assume various forms as long as it has regions whose flow path areas differ in the axial direction (for example, the first flow path portion and the second flow path portion) More specifically, the fluid flow path can be formed, for example, by the second flow path portion open at one axial end of the bearing member and the first flow path portion having a step portion between itself and the second flow path portion and open at one axial end of the bearing member. Alternatively, a region whose flow path area is gradually reduced from the second flow path portion toward the first flow path portion may be provided over a part of or all the axial dimension of the fluid flow path.

The fluid retaining space inside the bearing including these fluid flow paths is formed so as to be capable of communicating with the atmosphere through the seal space. In this case, it is desirable for the thrust bearing portion to be provided such that the first flow path portion is open to the atmosphere through the second flow path portion. When opening the first flow path portion on the outer side of the first dynamic pressure generating portion, it is desirable for the first dynamic pressure generating portion to be provided on the side closed to the atmosphere, i.e., on the side opposite to the seal space. With this construction, as compared with the case in which the first dynamic pressure generating portion is provided on the side of the seal space communicating with the atmosphere, the fluid pressure in the thrust bearing gap can be easily enhanced.

By forming the bearing member as an integral molding of resin and metal, it is possible to form the fluid flow path simultaneously with the bearing member main body at the time of molding of the bearing member.

The fluid dynamic bearing device, constructed as described above, can be suitably used for a motor having a rotor magnet and a stator coil, for example, a spindle motor for an HDD.

EFFECTS OF THE INVENTION

As described above, according to the present invention, it is possible to achieve a reduction in cost for a fluid dynamic bearing device.

Further, a fluid flow path for attaining a proper pressure state within a bearing can be formed with high accuracy and in a stable manner.

BEST MODE FOR CARRYING OUT THE INVENTION

In the following, an embodiment of the present invention will be described with reference to the drawings.

FIG. 1 is a diagram conceptually showing a construction example of an information apparatus spindle motor incorporating a fluid dynamic bearing device 1. The information apparatus spindle motor is used in a disk drive apparatus such as an HDD, and is equipped with: the fluid dynamic bearing device 1; a disk hub 3 mounted to the shaft member 2 of the fluid dynamic bearing device 1; a stator coil 4 and a rotor magnet 5 opposed to each other through the intermediation of, for example, a radial gap in a radial direction; and a bracket 6. The stator coil 4 is mounted to, for example, the outer periphery of the bracket 6 which is provided at a stator coil fixing portion 6b, and the rotor magnet 5 is mounted to the inner periphery of the disk hub 3. One or a plurality of disks D such as magnetic disks are retained on the outer periphery of the disk hub 3. When electricity is supplied to the stator coil 4, the rotor magnet 5 is rotated by an electromagnetic force generated between the stator coil 4 and the rotor magnet 5, and with this rotation, the disk hub 3 is rotated integrally with the shaft member 2.

FIG. 2 is a sectional view of the fluid dynamic bearing device 1 used in the spindle motor described above. The fluid dynamic bearing device 1 is mainly composed of the shaft member 2, a bearing member 7 in the inner periphery of which the shaft member 2 is inserted, and a cover member 8 and a seal member 9 that are fixed to the bearing member 7. In the following, for the sake of convenience in illustration, the side of the bearing member 7 sealed by the seal member 9 will be referred to as the upper side, and its side axially on the opposite side thereof will be referred to as the lower side.

In the fluid dynamic bearing device 1, between the inner peripheral surface 7a of the bearing member 7 and the outer peripheral surface of a shaft portion 2a of the shaft member 2, there are provided a first radial bearing portion R1 and a second radial bearing portion R2 so as to be axially spaced apart from each other. Further, between the lower end surface 7c of the bearing member 7 and the upper end surface 2b1 of a flange portion 2b of the shaft member 2, there is provided a first thrust bearing portion T1, and between the inner bottom surface 8a1 of the cover member 8 and the lower end surface 2b2 of the flange portion 2b, there is provided a second thrust bearing portion T2.

The shaft member 2 is formed of a metal material such a stainless steel, and is equipped with the shaft portion 2a and the flange portion 2b provided integrally or separately at the lower end of the shaft portion 2a. Apart from forming the entire shaft member 2 of metal, it is also possible, for example, to form all or a part (e.g., both end surfaces) of the flange portion 2b of resin, whereby it is possible to realize a hybrid structure of metal and resin.

The bearing member 7 is formed by injection molding of resin. The bearing member 7 is formed as an integral member composed of a sleeve portion 71 in the inner periphery of which the shaft portion 2a of the shaft member 2 is inserted, an upper protruding portion 72 formed on the outer diameter portion of the upper end of the sleeve portion 71, and a lower protruding portion 73 formed on the outer diameter portion of the lower end of the sleeve portion 71. The inner peripheral surface of the bearing member 7 is composed of a small diameter inner peripheral surface 7a and a first and second large diameter inner peripheral surfaces 7d1 and 7d2 which are of a larger diameter than that; the small diameter inner peripheral surface 7a is formed in the sleeve portion 71, the first large diameter inner peripheral surface 7d1 is formed in the upper protruding portion 72, and the second large diameter inner peripheral surface 7d2 is formed in the lower protruding portion 73. On the other hand, the outer diameter dimension of the outer peripheral surface 7b of the bearing 7 is substantially uniform throughout the sleeve portion 71 and the upper and lower protruding portions 72 and 73. The outer peripheral surface 7b of the bearing member 7 constitutes the fixing surface for fixation to the inner peripheral surface 6a of the bracket 6 shown in FIG. 1. The fixation of the bearing member 7 to the bracket 6 is effected, for example, by bonding.

A resin forming the bearing member 7 is mainly made of a thermoplastic resin, for example, it is possible to use: an amorphous resin such as polysulfone (PSU), polyether sulfone (PES), polyphenyl sulfone (PPSU), or polyether imide (PEI); or a crystalline resin such as liquid crystal polymer (LCP), polyetherether ketone (PEEK), polybutyrene terephthalate (PBT), or polyphenylene sulfide (PPS) There are no particular limitations regarding the filler to be used for the above resin, for example, it is possible to use: a fibrous filler such as glass fiber; a whisker-like filler such as potassium titanate; a scale-like filler such as mica; or a fibrous or powdered conductive filler such as carbon fiber, carbon black, graphite, carbon nanomaterial, and metal powder. These fillers may be used singly or in the form of a mixture of two or more of them. This embodiment employs, as the material forming the bearing member 7 of the fluid dynamic bearing device 1, a resin material obtained by mixing 2 to 8 wt % of carbon fiber or carbon nanotube as the conductive filler with liquid crystal polymer (LCP) as the crystalline resin.

On the small diameter inner peripheral surface of the bearing member 7, there are provided two upper and lower regions constituting the first radial bearing portion R1 and the second radial bearing portion R2 so as to be axially spaced apart from each other. In these two regions, there are formed a plurality of dynamic pressure grooves G arranged, for example, in a herringbone-like configuration as the dynamic pressure generating portions. The dynamic pressure grooves G of the upper region corresponding to the first radial bearing portion R1 are formed asymmetrically in the axial direction; within the region, the axial length X of the upper dynamic pressure grooves is somewhat larger than the axial length Y of the lower dynamic pressure grooves (X>Y). On the other hand, the dynamic pressure grooves G of the lower region corresponding to the second radial bearing portion R2 are formed symmetrically in the axial direction; within the region, the upper and lower dynamic pressure grooves G have the same axial length.

The regions of the small diameter inner peripheral surface 7a of the bearing member 7 constituting the radial bearing surfaces can be formed by molding simultaneously with the injection molding of the bearing member 7. This can be effected, for example, by forming, in the outer periphery of a core rod serving as the mold, molding portions having asperity features corresponding to the herringbone-like configuration, and injecting resin into a cavity, with the core rod being arranged at a predetermined position of the cavity corresponding to the configuration of the bearing member 7.

In this case, after the curing of the injection material, the molding portion of the core rod and the regions constituting the radial bearing surfaces are fit-engaged with each other in the axial direction, so a problem in terms of workability is involved at the time of releasing of the core rod. In this case, when, as described above, resin is used as the injection material, the resin of the regions constituting the radial bearing surfaces undergoes elastic deformation as the core rod is pulled out, and is then restored to the former configuration, so the core rod can be smoothly pulled out of the inner periphery of the bearing member 7 without breaking or damaging the dynamic pressure groove configuration after the molding. Of the above-mentioned examples of the resin material, LCP facilitates the pulling-out of the core rod because it allows the inner diameter dimension of the molding after curing to be larger than the outer diameter dimension of the core rod through examination of the flowing direction of the molten resin, molding conditions, etc. Further, PPS and PEEK help to achieve a reduction in anisotropy through appropriate selection of the filler, thereby making it possible to achieve an enhancement in dimensional precision such as circularity. Thus, they help to suppress deformation of the resin at the time of pulling out to thereby achieve an improvement in terms of workability in the pulling-out operation.

On the lower end surface 7c of the bearing member 7, there is formed a region constituting the thrust bearing surface of the first thrust bearing portion T1. In this region, there are formed a plurality of dynamic pressure grooves (not shown) arranged, for example, in a spiral configuration, as the dynamic pressure generating portions. These dynamic pressure generating portions can be formed by molding simultaneously with the injection molding of the bearing member 7.

As the molding material of the bearing member 7, it is possible to select a material other than resin as long as sufficient elastic deformation can be effected in the regions constituting the radial bearing surfaces when pulling out the core rod; for example, it is possible to form the bearing member 7 of a soft metal material such as brass, or some other metal material (including sintered metal). Further, as a mode of injection molding, it is also possible to adopt injection molding of a low melting point metal (e.g., aluminum alloy) or MIM molding.

The lower opening of the bearing member 7 is sealed by the cover member 8. Using a soft metal material such as brass, or some other metal material, or a resin material, the cover member 8 is formed as a bottomed cylinder composed of a bottom portion 8a and a cylindrical portion 8b protruding upwards from the outer diameter portion of the bottom portion 8a. On the inner bottom surface 8a1 of the cover member 8, there is formed a region constituting the thrust bearing surface of the second thrust bearing portion T2. In this region, there are formed a plurality of dynamic pressure grooves (not shown) arranged, for example, in a spiral configuration as the dynamic pressure generating portions. By causing the upper end surface of the cylindrical portion 8b to abut the lower end surface 7c of the bearing member 7 (the lower end surface of the sleeve portion 71), the thrust bearing gaps of the first thrust bearing portion T1 and the second thrust bearing portion T2 are set to predetermined widths. The outer peripheral surface of the cylindrical portion 8b is fixed to the large diameter inner peripheral surface 7d2 of the lower protruding portion 73 of the bearing member 7 by bonding, press-fitting, etc., whereby the cover member 8 is fixed to the bearing member 7. When the bearing member 7 and the cover member 8 are both formed of resin, the cover member 8 and the bearing member 7 can be integrated with each other by fixing by fusion bonding (e.g., ultrasonic fusion bonding).

The seal member 9 is formed in a ring-shape, is formed of a soft metal material such as brass, some other metal material, or a resin material, and is fixed to the large diameter inner peripheral surface 7d1 of the upper protruding portion 72, for example, by bonding. In this process, the lower end surface 9b of the seal member 9 is held in contact with the upper end surface 7e of the bearing member 7 (upper end surface of the sleeve portion 71), is engaged therewith in the axial direction.

The inner peripheral surface 9a of the seal member 9 forms between itself and the outer peripheral surface of the shaft portion 2a a seal space S having a predetermined volume. The inner peripheral surface 9a of the seal member 9 is formed as a tapered surface whose diameter increases gradually toward the exterior of the bearing member 7, so the seal space S exhibits a tapered configuration gradually diminished toward the interior of the bearing member. Thus, the lubricating oil in the seal space S is drawn-in in the direction where the seal S is diminished in size by the drawing action of capillary force, with the result that the opening at the upper end opening of the bearing member 7 is sealed. The inner space of the bearing member 7 sealed by the seal member 9 is filled with a lubricant, such as lubricating oil. The seal space S also has a buffer function to absorb a change in volume due to a change in the temperature of the lubricating oil filling the inner space of the bearing member 7, so the oil level is always inside the seal space S.

It is also possible to form the inner peripheral surface 9a of the seal member 9 as a cylindrical surface, and to form the outer peripheral surface of the shaft portion 2a opposed thereto as a tapered surface. In this case, the function of a centrifugal seal is also obtained, so the seal effect is further enhanced.

During rotation of the shaft member 2, of the small diameter inner peripheral surface 7a of the bearing member 7, the two upper and lower regions constituting the radial bearing surfaces are opposed to the outer peripheral surface of the shaft portion 2a through the intermediation of the radial bearing gaps. Further, the region of the lower end surface 7c of the bearing member 7 (the lower end surface of the sleeve portion 71) constituting the thrust bearing surface is opposed to the upper end surface 2b1 of the flange portion 2b through the intermediation of a predetermined thrust bearing gap, and the region of the inner bottom surface 8a1 of the cover member 8 constituting the thrust bearing surface is opposed to the lower end surface 2b2 of the flange portion 2b through the intermediation of a predetermined thrust bearing gap. As the shaft member 2 rotates, a dynamic pressure of the lubricating oil is generated in the radial bearing gap, and the shaft member 2 is rotatably supported in the radial direction in a non-contact fashion by films of the lubricating oil formed in the radial bearing gaps. As a result, there are formed the first radial bearing portion R1 and the second radial bearing portion R2 rotatably supporting the shaft member 2 in the radial direction in a non-contact fashion. At the same time, a dynamic pressure of the lubricating oil is generated in the thrust bearing gaps, and the shaft member 2 is rotatably supported in the thrust direction in a non-contact fashion by films of the lubricating oil formed in the thrust bearing gaps. As a result, there are formed the first thrust bearing portion T1 and the second thrust bearing portion T2 rotatably supporting the shaft member in the thrust direction in a non-contact fashion.

In the fluid dynamic bearing device 1, there is formed a fluid flow path 10 for establishing communication between the bearing gap of the first thrust bearing portion T1 and the seal space S. The fluid flow path 10 is composed of an axially extending portion (axial portion) 10a extending through the sleeve portion 71 of the bearing member 7 to open at the upper and lower end surfaces 7e and 7c, and a radially extending portion (radial portion) 10b establishing communication between the upper end of the axial portion 10a and the seal space S. In the fluid dynamic bearing device 1 described above, a case is shown where the axial portion 10a is open to the space between the outer peripheral surface of the flange portion 2b and the inner peripheral surface of the cover member 8. The radial portion 10b may be formed by a groove formed in the upper end surface 7e of the sleeve portion 71 as shown in the drawing, or it may be formed by a groove formed in the lower end surface 9b of the seal member 9.

In the fluid flow path 10, the axial portion 10a may be formed in an arbitrary manner. For example, at the stage of forming the bearing member by injection molding, it is possible to inject resin with a molding pin stretched in the cavity, pulling out the molding pin afterwards at the time of releasing. Apart from this, it is also possible to form the axial portion 10a by machining or the like after the injection molding. The radial portion 10b can be formed, for example, simultaneously with the injection molding of the bearing member 7, or machining or the like after the injection molding.

As described above, the dynamic pressure grooves G of the first radial bearing portion R1 are formed asymmetrically in the axial direction, with the axial dimension X of the region on the upper side being larger than the axial dimension Y of the region on the lower side thereof. Thus, during rotation of the shaft member 2, the lubricating oil drawing force (i.e., pumping force) due to the dynamic pressure grooves G is larger in the upper region than in the lower region. With this difference in drawing force, the lubricating oil filling the gap between the small diameter inner peripheral surface 7a of the bearing sleeve 7 and the outer peripheral surface of the shaft portion 2a flows downwards, circulates through the route in the following order: the thrust bearing gap of the first thrust bearing portion T1; the axial direction portion 10a of the fluid pass 10; the radius direction portion 10b; the thrust bearing gap of the first radial bearing portion R1, and then the lubricating oil is drawn into the radial bearing gap of the first radial bearing portion R1 again. In this way, the lubricating oil flows and circulates through the inner space of the bearing member 7, whereby it is possible to prevent a phenomenon in which the pressure of the lubricating oil filled in the inner space locally becomes a negative pressure, making it possible to eliminate the generation of bubbles as a result of the generation of a negative pressure, and leakage of the lubricating oil, generation of vibration, etc. due to the generation of bubbles. Further, if, for some reason, bubbles are allowed to be mixed into the lubricating oil, the bubbles are discharged into the atmosphere through the oil surface (gas-liquid interface) of the lubricating oil in the seal space S when they circulate with the lubricating oil, so it is possible to more effectively prevent the adverse effects of the bubbles.

In the fluid dynamic bearing device 1 described above, the shaft member 2, the bearing member 7, the cover member 8, and the seal member 9 are the main components, and it is possible to achieve a reduction in the number of components as compared with the conventional example shown in FIG. 19. Further, there is no need to perform the step of fixing the bearing sleeve and the housing to each other, which is required in the assembly process for the conventional example. Thus, it is possible to reduce the cost of the fluid dynamic bearing device 1. Further, in this fluid dynamic bearing device, the width precision of the thrust bearing gaps of the thrust bearing portions Ti and T2 depends not on the assembly precision but on the molding precision of the shaft member 7 and the cover member 8. Thus, by molding the shaft member 7 and the cover member 8 with a sufficient precision, it is possible to set the gap width of the thrust bearing gaps with high precision, thus facilitating the gap width control. Further, since the upper end surface 7e of the bearing member 7 and the lower end surface 9b of the seal member 9 are in contact with each other in the axial direction, it is possible to enhance the positional accuracy of the seal member 9 in the axial direction.

FIG. 3 shows another construction of the fluid dynamic bearing device 1. This fluid dynamic bearing device 1 differs from that shown in FIG. 2 in that the cover member 8 is formed as a flat plate and is fixed to the large diameter inner peripheral surface 7d2 of the lower protruding portion 73. In this case, a step portion 7f is formed on the large diameter inner peripheral surface 7d2, and the step portion 7f is engaged with the outer portion of the cover member 8, whereby it is possible to control the gap widths of the thrust bearing gaps of the thrust bearing portions T1 and T2 with high accuracy.

FIG. 4 shows another construction of the fluid dynamic bearing device 1. This fluid dynamic bearing device 1 differs from those shown in FIGS. 2 and 3 in that the thrust bearing portion is formed not by a fluid dynamic bearing but by a pivot bearing. The pivot bearing has a construction in which a spherical shaft end 2c of the shaft member 2 is held in contact with the inner bottom surface 8a1 of the cover member 8 (or another member of low friction arranged on the inner bottom surface 8a1), whereby there is formed a thrust bearing portion T contact-supporting the shaft member 2 in the thrust direction. While in the example shown in the drawing the cover member 8 is formed integrally with the bearing member 7, they may also be formed as separate members. Further, although not shown, it is also possible to provide a fluid flow path 10 as in the fluid dynamic bearing devices shown in FIGS. 2 and 3, allowing the space formed between the shaft end 2c of the shaft member 2 and the bearing member 7 to communicate with the seal space S.

FIG. 5 shows another construction of the fluid dynamic bearing device 1. This fluid dynamic bearing device differs from the dynamic pressure device shown in FIG. 2 mainly in that the seal member 9 is fixed to the shaft member 2, which constitutes the rotating side. In this case, the seal space S is formed between the outer peripheral surface 9c of the seal member 9 and the large diameter inner peripheral surface 7d1 of the upper protruding portion 72. During rotation of the shaft member 2, the lower end surface 9b of the seal member 9 is opposed to the upper end surface 7e of the bearing member 7 through the intermediation of a thrust bearing gap, thus forming the second thrust bearing portion T2. When the shaft member 2 is at rest, the lower end surface 9b of the seal member 9 and the upper end surface 7e of the bearing member 7 are engaged with each other in the axial direction. When fixing the seal member 9 to the shaft member 2 at the assembly stage, the lower end surface 9b of the seal member 9 and the upper end surface 7e of the bearing member 7 are engaged with each other in the axial direction, whereby it is possible to accurately control the gap widths of the thrust bearing gaps of the first and second thrust bearing portions Ti and T2.

The outer peripheral surface 9c of the seal member 9 is formed as a tapered surface gradually reduced in diameter toward the exterior of the bearing member 7, so the seal space S exhibits a tapered configuration gradually diminished toward the interior of the bearing member 7. In this case, the seal space S is on the outer peripheral surface 9a side of the seal member 9, so, in securing the requisite volume for obtaining a predetermined buffer function in the seal space S, it is possible to make the axial dimension of the seal space S (seal member 9) smaller than that of the fluid dynamic bearing device shown in FIG. 2. Thus, it is possible to reduce the axial dimension of the fluid dynamic bearing device 1.

In the fluid dynamic bearing device 1 shown in FIG. 5, only the axial portion 10a is provided as the fluid flow path 10, and the thrust bearing gap of the first thrust bearing portion T1 communicates with the seal space S through the axial portion 10a. As the shaft member 2 rotates, the lubricating oil, which has flowed downwards through the gap between the inner peripheral surface 7a of the bearing member 7 and the outer peripheral surface of the shaft portion 2a, circulates through the route in the following order: the thrust bearing gap of the first thrust bearing portion T1; the axial portion 10a; and the thrust bearing gap of the second thrust bearing portion T2, and then the lubricating oil is drawn into the radial bearing gap of the first radial bearing portion R1 again.

At this time, the inward drawing force (i.e., pumping force) for the lubricating oil by the dynamic pressure grooves G of the second thrust bearing portion T2 also acts on the lubricating oil in the radial bearing gap of the first radial bearing portion R1, so even if the above-mentioned difference in drawing force in the first radial bearing portion R1 is relatively small, it is possible to secure a satisfactory flowing circulation of the lubricating oil. As a result, it is possible to reduce the axial asymmetry of the dynamic pressure grooves G of the first radial bearing portion R1 as compared with that in the prior art. For example, it is possible to diminish the axial dimension X of the upper region of the dynamic pressure grooves G as compared with that of the prior, or to diminish the axial dimension of the bearing sleeve 8.

FIG. 6 shows another construction of the fluid dynamic bearing device 1. This fluid dynamic bearing device 1 differs from the fluid dynamic bearing device shown in FIG. 5 in that not only is the upper end opening of the bearing member 7 sealed by the first sealing member 9 but also the opening sealed by the cover member 8 is sealed by a second seal member 11. A first seal space S1 is formed between the outer peripheral surface 9c of the first seal member 9 and the large diameter inner peripheral surface 7d1 of the upper protruding portion 72, and a second seal space S2 is formed between the outer peripheral surface 11c of the second seal member 11 and the large diameter inner peripheral surface 7d2 of the lower protruding portion 72. The seal spaces S1 and S2 communicate with each other through the axial portion 10a of the fluid flow path 10. During rotation of the shaft member 2, the lower end surface 11b of the second seal member 11 is opposed to the lower end surface 7c of the bearing member 7 through the intermediation of a thrust bearing gap, thereby forming the first thrust bearing portion T1.

As in the case of the first seal member 9, the outer peripheral surface 11c of the second seal member 11 is formed as a tapered surface gradually increased in diameter toward the interior of the bearing member 7, whereby the second seal space S2 exhibits a tapered configuration gradually diminished toward the interior of the bearing member.

In this case, the seal spaces S1 and S2 are formed at the openings at both ends of the bearing member 7, so, as compared with the fluid dynamic bearing device 1 shown in FIG. 5, in which the seal space S is formed only at the upper end opening, it is possible to enhance the buffer function of the bearing device as a whole. Thus, it is possible to make the volumes of the seal spaces S1 and S2 smaller, reducing the axial dimensions of the seal members 9 and 11, and achieving a further reduction in the axial dimension of the fluid dynamic bearing device.

While in the examples described above a dynamic pressure action of the lubricating oil is generated by dynamic pressure grooves of a herringbone-like and a spiral configuration constituting the radial bearing portions R1 and R2 and the thrust bearing portions T1 and T2, it is also possible to adopt so-called step bearings or multi-arc bearings as the radial bearing portions R1 and R2, and form the thrust bearing portions T1 and T2 as, for example, so-called step bearings in which dynamic pressure grooves are arranged radially or so-called corrugated bearings (whose step form is corrugated).

Further, while in the above-mentioned examples the dynamic pressure grooves G of the first and second radial bearing portions R1 and R2 are formed in the small diameter inner peripheral surface 7a of the sleeve portion 71, it is also possible to form the dynamic pressure grooves G in the outer peripheral surface of the shaft portion 2a of the shaft member 2. More specifically, the two upper and lower regions constituting the radial bearing surfaces of the first radial bearing portion R1 and the second radial bearing portion R2 are formed on the outer peripheral surface of the shaft portion 2a of the shaft member 2 so as to be axially spaced apart from each other, and a plurality of dynamic pressure grooves G arranged, for example, in a herringbone-like configuration are formed in these two regions as the dynamic pressure generating portions. The upper and lower regions constituting the radial bearing surfaces of the outer peripheral surface of the shaft portion 2a can be formed by forging, rolling, etching, or printing. During rotation of the shaft member 2, of the outer peripheral surface of the shaft portion 2a, the two upper and lower regions constituting the radial bearing surfaces are opposed to the small diameter inner peripheral surface 7a of the bearing member 7 through the intermediation of radial bearing gaps, and a dynamic pressure of the lubricating oil is generated in the radial bearing gaps. In this construction, in selecting the molding material for the bearing member 7, there is no need to take into consideration the elastic deformability when pulling out the core rod.

FIGS. 7 and 8 show examples of the case in which one or both of the radial bearing portions R1 and R2 are formed by multi-arc bearings. Of these, in the example shown in FIG. 7, the region of the small diameter inner peripheral surface 7a of the sleeve portion 71 constituting the radial bearing surface is formed by three arcuate surfaces 7a1 as the dynamic pressure generating portions (a so-called three-arc bearing). The centers of curvature of the three arcuate surfaces 7a1 are offset from the axial center O of the bearing member 7 (the shaft member 2) by the same distance. In each of the regions defined by the three arcuate surfaces 7a1, the radial bearing gap is gradually diminished in a wedge-like fashion in both circumferential directions. Thus, when the bearing member 7 and the shaft member 2 make relative rotation, the lubricating oil in the radial bearing gap is forced into the minimum wedge-like gaps according to the direction of the relative rotation, and undergoes an increase in pressure. By this dynamic pressure action of the lubricating oil, the bearing member 7 and the shaft member 2 are supported in a non-contact fashion. Axial grooves one step deeper and called separation grooves may be formed in the boundary portions between the three arcuate surfaces 7a1.

FIG. 8 shows another example of the multi-arc bearing, in which, in each of the regions defined by the three arcuate surfaces 7a1, the radial bearing gap is gradually diminished in a wedge-like fashion in one circumferential direction. A multi-arc bearing of this construction is sometimes called a tapered bearing. Further, axial grooves 7a3 one step deeper and called separation grooves are formed in the boundary portions between the three arcuate surfaces 7a1. Although not shown, in this construction, predetermined regions on the minimum gap side of the three arcuate surfaces 7a1 may be formed by concentric arcs whose centers of curvature coincide with the axial center O of the bearing member 7 (the shaft member 2) (The bearing is sometimes called a tapered flat bearing).

As in the case of the herringbone-shaped dynamic pressure grooves G, the dynamic pressure generating portions composed of the multi-arcuate surfaces 7a1 can be formed by molding simultaneously with the injection molding of the bearing member 7. In this case, unlike the herringbone-shaped configuration and the spiral configuration, no axial fit-engagement occurs between the multi-arcuate surface 7a1 and the molding portion of the core rod, so the core rod can be smoothly pulled out of the inner periphery of the bearing member 7 at the time of releasing. Thus, elastic deformability is less important as a characteristic of the material of the bearing member 7, whereby the degree of freedom in material selection is increased.

While in the above-mentioned examples the dynamic pressure grooves of the first and second thrust bearing portions T1 and T2 are formed in the end surface 7c of the bearing member 7 and the inner bottom surface 8a1 of the cover member 8, it is also possible to form dynamic pressure grooves as dynamic pressure generating portions in one or both of the end surfaces 2b1 and 2b2 of the flange portion 2b.

In the following, another embodiment of the present invention will be described with reference to FIGS. 9 through 18.

FIG. 9 is a conceptual drawing showing an example of the construction of an information apparatus spindle motor into which the fluid dynamic bearing device 1 is incorporated. This spindle motor is used in a disk drive device, such as an HDD, and is equipped with: the fluid dynamic bearing device 1 supporting the shaft member 2 equipped with the shaft 2a' and a hub portion 15 rotatably and in a non-contact fashion; the stator coil 4 and the rotor magnet 5 opposed to each other through the intermediation, for example, of a radial gap; and the bracket 6. The stator coil 4 is mounted to the outer side of the bracket 6, and the rotor magnet 5 is mounted to the outer periphery of the hub portion 15 of the shaft member 2. The bearing member 7 of the fluid dynamic bearing device 1 is fixed to the inner periphery of the bracket 6. Further, although not shown, one or a plurality of disk-like information recording mediums, such as magnetic disks (hereinafter simply referred to as the disk), are held by the hub portion 15 of the shaft member 2. When, in the spindle motor constructed as described above, the stator coil 4 is energized, an excitation force generated between the stator coil 4 and the rotor magnet 5 rotates the rotor magnet 5, with the result that the shaft member 2 and the disks held by the hub portion 10 of the shaft member 2 rotate together with the shaft 2a'.

FIG. 10 is an enlarged view of the fluid dynamic bearing device 1. The fluid dynamic bearing device 1 is mainly equipped with the shaft member 2 and the bearing member 7 capable of accommodating the shaft 2a' of the shaft member 2 in the inner periphery thereof. For the sake of convenience in illustration, of the openings of the bearing member 7 (the housing portion 14) formed at both axial ends thereof, the one sealed by a cover member 16 will be referred to as the lower opening, and the one on the side opposite to the sealed side will be referred to as the upper opening.

The shaft member 2 is equipped with the hub portion 15 arranged, for example, on the opening side of the bearing member 7 and the shaft 2a' extending in the direction of the rotation axis from the radial center of the hub portion 15.

The hub portion 15 is formed of metal or resin, and is composed of a disc portion 15a covering the opening side (upper side) of the bearing member 7, a cylindrical portion 15b extending axially downwards from the outer peripheral portion of the disc portion 15a, a disk mounting surface 15c provided in the outer periphery of the cylindrical portion 15b, and a flange portion 15d. The disks (not shown) are fitted onto the outer periphery of the disc portion 15a, and placed on the disk mounting surface 15c. The disks are held on the hub portion 15 by an appropriate holding means, such as a damper (not shown).

The shaft 2a' is formed integrally with the hub portion 15, and is separately equipped at its lower end with a flange portion 2b serving as a detachment preventing member. The flange portion 2b is formed of metal, and is fixed to the shaft 2a' by a fixing means, such as a screw. Instead of forming the shaft 2a' and the hub portion 15 integrally of metal or resin as described above, it is also possible to form the shaft 2a' and the hub portion 15 as separate components. In this case, the shaft 2a' is formed, for example, of metal, and the shaft member 2 can be formed by molding integrally with the hub portion 15, with the metal shaft 2a' used as an insert component.

The bearing member 7 is formed in a configuration open at both axial ends, and is mainly equipped with a substantially cylindrical sleeve portion 13, and a housing portion 14 situated on the outer side of the sleeve portion 13 and retaining the sleeve portion 13 in the inner periphery thereof. The bearing member 7 is formed by injection molding of a resin composition using as the base resin a crystalline resin, such as LCP, PPS, or PEEK, or an amorphous resin, such as PSU, PES, or PEI, whereby the sleeve portion 13 and the housing portion 14 are formed integrally.

A region where a plurality of dynamic pressure grooves are arranged as radial dynamic pressure generating portions is formed over all or a part of the cylindrical region of the inner peripheral surface 8a of the sleeve portion 13. As shown, for example, in FIG. 11, in this fluid dynamic bearing device, two regions where a plurality of dynamic pressure grooves 13a1 and 13a2 are arranged in a herringbone-like configuration are formed so as to be axially spaced apart from each other. In the upper region where the dynamic pressure grooves 13a1 are formed, the dynamic pressure grooves 13a1 are formed axially asymmetrically with respect to the axial center m (axial center between the upper and lower inclined groove formation regions); the axial dimension X1 of the region higher than the axial center m is larger than the axial dimension X2 of the region lower the axial center m. Thus, during rotation of the shaft member 2, due to the asymmetrical dynamic pressure grooves 13a1, the lubricating oil in the radial bearing gap is forced in downwards.

A first thrust bearing surface 13b is provided over all or a part of the annular surface region of the lower end surface of the sleeve portion 13. As shown, for example, in FIG. 13, there is formed in the first thrust bearing surface 13b a region where a plurality of dynamic pressure grooves 13b1 are arranged in a spiral configuration as the first thrust dynamic pressure generating portion. The first thrust bearing portion surface 13b (the dynamic pressure groove 13b1 formation region) is opposed to the upper end surface 2b1 of the flange portion 2b; during rotation of the shaft 2a1 (the shaft member 2), the thrust bearing gap of the first thrust bearing portion Ti is formed between it and the upper end surface 2b1 (see FIG. 10)

The housing portion 14 situated on the outer side of the sleeve portion 13 is formed substantially in a cylindrical configuration, and its axial width is larger than that of the sleeve portion 13. The lower end in the axial direction of the housing 9 protrudes further downwards than the lower end surface of the lower end surface (first thrust bearing surface 13b) of the sleeve portion 13.

One end surface (the upper end surface) of the housing 14 is situated somewhat above the upper end surface 13c of the sleeve portion 13 continuous with the inner periphery thereof, and a second thrust bearing surface 14a is provided over all or a part of the annular region thereof. As shown, for example, in FIG. 12, there is formed in the second thrust bearing surface 14a a region where a plurality of dynamic pressure grooves 14a1 are arranged in a spiral configuration (with the spiral direction thereof being reverse to that of the dynamic pressure grooves 13b1 of shown in FIG. 13) as a second thrust dynamic pressure generating portion. The second thrust bearing surface 9a14a (the dynamic pressure groove 14a1 formation region) is opposed to the lower end surface 15a1 of the disc portion 15a of the hub portion 15; during rotation of the shaft member 32, there formed between it and the lower end surface 15a 1 the thrust bearing gap of a second thrust bearing portion T2 (see FIG. 10).

The cover member 16 sealing the lower end of the housing portion 14 (the bearing member 7) is formed of metal or resin, and is fixed to a step portion 14b provided on the inner peripheral side of the lower end of the housing 14. Here, there is no particular limitations regarding the fixing means; it is possible to select as appropriate a means, such as bonding (including loose bonding and press-fit bonding), press-fitting, fusion bonding (for example, ultrasonic fusion bonding), or a welding (for example, laser welding) according to the material combination, the requisite assembly strength, and sealing property.

In the outer periphery of the housing portion 14, there is formed a tapered seal surface 14c gradually increasing in diameter as it extends upwards. The tapered seal surface 14c forms between itself and the inner peripheral surface 15b1 of the cylindrical portion 15b an annular seal space S gradually reduced in space in radial dimension from the sealed side (lower side) toward the open side (upper side) of the bearing member 7. During rotation of the shaft 2a' and the hub portion 15, the seal space S communicates with the outer side of the thrust bearing gap of the second thrust bearing portion T2.

As shown in FIG. 11, formed at the radially intermediate portion of the bearing member 7 are one or a plurality of communication holes 12 as fluid flow paths extending axially through the bearing member 7. For example, four such communication holes 12 are provided at equal circumferential interval, and are opened at the lower ends thereof on the outer side of the first thrust bearing surface 13b of the sleeve portion 13 (see FIG. 13). Further, at their upper ends, the communication holes 12 are opened on the inner side of the second thrust bearing surface 14a of the housing portion 14 (see FIG. 12) As a result, in the state in which the interior of the bearing device is filled with a lubricating oil described below, the lubricating oil can circulate between the thrust bearing portions of the two thrust bearing portions Ti and T2. Further, the lubricating oil can circulate between both axial end surfaces 13b and 13c of the sleeve portion 13, or between both ends of the gap between the outer peripheral surface 2a of the shaft 2a' and the inner peripheral surface 13a of the sleeve portion 13 including the radial bearing gaps situated on the inner side thereof (see FIG. 10 for all of them).

Further, the sectional area of the communication holes 12 varies in the axial direction; they are of a relatively small diameter (small diameter portions 12a) on the side of the opening at the lower end surface including the first thrust bearing surface 13b, and are of a relatively large diameter (large diameter portions 12b) on the side of the opening at the upper end surface including the second thrust hearing surface 14a.

The communication holes 12 can be formed simultaneously with the molding of the bearing member 7 when, for example, injection molding the bearing member 7 from resin. Although not shown, in this process, for the molding of the communication holes 12, there are used, for example, molding pins of a configuration in conformity with the communication holes 12 described above; here, there are used molding pins having outer diameter dimensions corresponding to the small diameter portions 12a and the large diameter portions 12b.

The interior of the fluid dynamic bearing device 1, constructed as described above, is filled with lubricating oil, and the oil level of the lubricating oil is always maintained within the seal space S. As shown, for example, in FIG. 10, in this fluid dynamic bearing device, the communication holes 12, and the regions including the thrust bearing gaps of the thrust bearing portions T1 and T2 respectively formed at both axial ends of the communication holes 12 (the spotted regions in FIG. 10) are filled with the lubricating oil. As the lubricating oil, various types of oil can be used; in the case of a lubricating oil to be supplied to a fluid dynamic bearing device for a disk drive device, such as an HDD, taking into account the change in temperature during use or transportation, it is possible to suitably use an ester type lubricating oil superior in low evaporation rate and low viscosity, such as dioctyl sebacate (DOS) or dioctyl azelate (DOZ).

In the fluid dynamic bearing device 1, constructed as described above, during rotation of the shaft 2a' (the shaft member 2), the regions of the inner peripheral surface 13a of the sleeve portion 13 constituting the radial bearing surfaces (regions where the two upper and lower dynamic pressure grooves 13a1 and 13a2 are formed) are opposed to the cuter peripheral surface 2a of the shaft 2a' through the intermediation of the radial bearing gaps. As the shaft 2a' rotates, the lubricating oil in the radial bearing gaps is forced in toward the axial centers of the dynamic pressure grooves 13a1 and 13a2, and undergoes an increase in pressure. By this dynamic pressure action of the dynamic pressure grooves 13a1 and 13a 2, there are formed the first radial bearing portion R1 and the second radial bearing portion R2 supporting the shaft 2a' radially in a non-contact fashion.

At the same time, films of lubricating oil are formed by the dynamic pressure action of the dynamic pressure grooves 13b 1 and 14a1 in the thrust bearing gap between the first thrust bearing surface 13b of the sleeve portion 13 (the region where the dynamic pressure grooves 13b1 are formed, and the upper end surface 2b1 of the flange portion 2b opposed thereto and in the thrust bearing gap between the second thrust bearing surface 14a of the housing portion 14 (the region where the dynamic pressure grooves 14a 1 are formed) and the lower end surface 15a 1 of the hub portion 15 opposed thereto (disc portion 15a). By the pressure of these oil films, there are formed the first thrust bearing portion Ti and the second thrust bearing portion T2 supporting the shaft member 2 in the thrust direction in a non-contact fashion.

By thus providing the bearing member 7 with the communication holes 12 as the fluid flow paths, communication is established through the communication holes 12 between the thrust bearing gap of the second thrust bearing portion T2 situated at the lower end of the bearing member 7 (the sleeve portion 13) and the seal space S formed on the opening side of the bearing member 7 (outer side of the housing portion 14). In this construction, it is possible, for example, to avoid an excessive increase or reduction in the fluid (lubricating oil) pressure on the second thrust bearing portion T2 side for some reason or other, thereby making it possible to support the shaft member 2 in the thrust direction in a non contact fashion and in a stable manner.

Further, by providing the small diameter portions 12a as the first flow path portions on the side of the thrust bearing gap of the first thrust bearing portion T1 (lower end side), it is possible to outwardly enlarge the area of the first thrust bearing surface 13b of the sleeve portion 13 (the region where the dynamic pressure grooves 13b1 are formed). As a result, it is possible to support the load of the rotary member (shaft member 2), for example, in the radial direction as a result of an increase in the number of disks also by the thrust bearing portion, thereby achieving a stable rotational accuracy. Further, by providing the communication holes 12 with the small diameter portions 12a on the opening side of the thrust bearing gap of the first thrust bearing portion Ti, it is possible to circulate the fluid between both ends of the radial bearing gap while suppressing as much as possible escape of the fluid in the thrust bearing gap into the fluid flow paths (the communication holes 12), thus making it possible to maintain pressure balance between both ends. At the same time, by providing the large diameter portions 12b as the second flow path portions on the side of the thrust bearing gap of the second thrust bearing portion T2 (upper end side) of the communication holes 12 provided in the bearing member 7, it is possible to increase the lubricating oil retaining region in the interior of the bearing including the large diameter portions 12b. This construction proves particularly effective in the case in which the bearing member 7 is integrally molded from resin, and in which the lubricating oil retaining region other than the radial bearing gaps and the thrust bearing gaps is relatively small.

Further, in the fluid dynamic bearing device 1, the communication holes 12 having the large diameter portions 12b are formed by injection molding of the bearing member 7, so, at least at the positions corresponding to the large diameter portions 12b, it is possible to enhance the rigidity or strength of the pins used. Further, by providing the large diameter portions 12b, it is possible to reduce the axial width of the small diameter portions 12a, whereby it is possible to improve the portions of the molding pins corresponding to the small diameter portions 12a in terms of bending rigidity. Thus, when the communication holes 12 (the fluid flow paths) are to be reduced in diameter in order to achieve a reduction in the size of the fluid dynamic bearing device 1, even if the outer diameter dimension of the pins is wholly reduced in correspondence with the inner diameter dimension of the communication holes 12, it is possible to maintain the requisite rigidity and strength of the pins. Thus, it is possible to easily meet a demand for a reduction in the size of the fluid dynamic bearing device 1 and the size of the motor equipped with the fluid dynamic bearing device 1.

Further, in the fluid flow paths formed by this method, generation of chips or the like in the flow paths after the machining can be suppressed, so it is possible to simplify or omit the cleaning operation for removing such impurities, which is advantageous in terms of cost.

Further, in the fluid dynamic bearing device 1, the dynamic pressure grooves 13*a* 1 of the first radial bearing portion R1 are formed axially asymmetrically with respect to the axial center m (X1 >X2) (see FIG. 11), so, during rotation of the shaft 2*a* ', the drawing force (pumping force) due to the dynamic pressure grooves 13*a*1 is larger in the upper region than in the lower region. Due to this difference in drawing force, the lubricating oil filling the space between the inner peripheral surface 13*a* of the sleeve portion 13 and the outer peripheral surface 2*a* of the shaft 2*a*' flows downwards, and circulates through the route: the thrust bearing gap of the first thrust bearing portion T1, the communication holes 12, and the axial gap between the upper end surface 13*c* and the lower end surface 15*a* 1 before being drawn into the radial bearing gap of the first radial bearing portion R1 again. In this way, with the construction in which the bearing member 7 is provided with the axial communication holes 12 and in which the lubricating oil flows and circulates in the bearing inner space including the radial bearing gaps, an appropriate pressure balance is maintained in the interior of the bearing including the bearing gaps. Further, it is possible to prevent an undesirable flow in the inner space of the bearing, for example, a phenomenon in which the pressure of the lubricating oil locally becomes negative pressure, thereby resolving problems such as generation of bubbles due to negative pressure generation, and leakage of lubricating oil or generation of vibration due to generation of bubbles.

The fluid dynamic bearing device of the present invention is not restricted to the above-mentioned construction but allows adoption of other constructions. In the following, an example of the other constructions of the fluid dynamic bearing device will be described. In the drawings referred to below, the portions and members of the same construction and effect as those of the fluid dynamic bearing device shown in FIG. 10 are indicated by the same reference numerals, and a redundant description thereof will be omitted.

In a fluid dynamic bearing device 21 constructed as shown in FIG. 14, a shaft member 22 is equipped with a shaft 22*a* and a flange portion 22*b* provided integrally or separately at the lower end of the shaft 22*a*.

A bearing member 27 is equipped with the sleeve portion 13 and a housing portion 29 situated on the outer side of the sleeve portion 13 and formed integrally with the sleeve portion 13.

Both axial ends of the housing portion 29 protrude axially upwards and downwards from the end surfaces 13*b* and 13*c* of the sleeve portion 13. An annular seal portion 24 is fixed to the inner periphery of an upper end protruding portion 29*a*, with a lower end surface 24*b* thereof being in contact with the upper end surface 13*c* of the sleeve portion 13. An annular seal space S2 is formed between the inner peripheral surface 24*a* of the seal portion 24 and the outer peripheral surface 22*a* 1 of the shaft 22*a* opposed to this surface. A cover member 25 sealing the lower end of the bearing member 27 is fixed to the inner periphery of a lower end protruding portion 29*b* of the housing portion 29.

A second thrust bearing surface 25*a* is provided in a partially annular region of the upper end surface of the cover member 25. In this fluid dynamic bearing device 21, a dynamic pressure groove arrangement region as shown, for example, in FIG. 12, is formed on the second thrust bearing surface 25*a* as the thrust dynamic pressure generating portion. A protruding portion 25*b*, which protrudes upwardly, is provided in the outer periphery of the second thrust bearing surface 25*a*. The cover member 25 is fixed to the lower end protruding port ion 29*b*, with a contact surface 25*b*1 situated at the upper end of the protruding portion 25*b* being in contact with the lower end surface of the sleeve portion 13.

In this construction, the fluid flow paths are formed by the communication holes 12 axially extending through the bearing member 27 and opening at both axial ends thereof (at the sides of both end surfaces 13*b* and 13*c* of the sleeve portion 13), and radial grooves 25*c* provided in the contact surface 25*b*1 of the cover member 25 and establishing communication between the open lower ends of the communication holes 12 and the slide bearing gaps of thrust bearing portions T11 and T12 described below. Further, in the lower end surface 24*b* of the seal portion 24, there are formed one or a plurality of radial grooves 24*b*1 establishing communication between the lower open ends of the communication holes 12 and the upper end of the radial bearing gap of the first radial bearing portion R1.

In the fluid dynamic bearing device 21, constructed as described above, during rotation of the shaft member 22, the first thrust bearing portion T11 is formed between the first thrust bearing surface (lower end surface) 13*b* of the sleeve portion 13 and the upper end surface 22*b*1 of the flange portion 22*b* of the shaft member 22, and the second thrust bearing portion T12 is formed between the second thrust bearing surface 25*a* of the cover member 25 and the lower end surface 22*b*2 of the flange portion 22*b*.

In the fluid dynamic bearing device 21 also, by providing the bearing member 27 with the communication holes 12 varying in its sectional area (having the small diameter portions 12*a* and the large diameter portions 12*b*), it is possible to obtain the same effects as those of the fluid dynamic bearing device 1 shown in FIG. 10 (such as proper pressure balance, an improvement in the moldability of the fluid flow paths, and an increase in lubricating oil retaining amount).

While in the above-mentioned examples the bearing member 7, 27 is formed as an integral molding, this should not be construed restrictively; it is also possible, for example, to form the bearing member 7, 27 of two or more members.

A fluid dynamic bearing device 31 shown in FIG. 15 mainly differs from the fluid dynamic bearing device 1 shown in FIG. 10 in that the sleeve portion 13 and the housing portion 9 constituting the bearing member 7 are formed as separate components.

The sleeve portion 13 is formed of a metal such as brass or aluminum, or a porous material formed of sintered metal. In the fluid dynamic bearing device 31, the sleeve portion 13 is formed of a porous material formed of a sintered metal whose main component is copper, and the outer peripheral surface 13*d* thereof is fixed to the inner peripheral surface 14*d* of the housing portion 14 by means such as bonding, press-fitting, or fusion bonding. Further, in the case in which the sleeve portion 13 is thus formed separately from the housing portion 14 and is fixed to the housing portion 14, it is also possible, although not shown, to form the shaft 2*a*' in straight configuration having no flange portion 2*b*. In this case, the housing portion 14 is formed as a bottom cylinder by forming it integrally using the cover member 16 as the bottom portion.

One of a plurality of axial grooves 32 are formed in the outer peripheral surface 13*d* so as to extend over the entire axial length, and the fluid flow paths are formed by the axial grooves 32. In the fluid dynamic bearing device 31 shown, a plurality of (e.g., three) axial grooves 32 are formed at equal circumferential intervals, each axial groove 32 having a small diameter portion 32a on the first thrust bearing portion Ti side and a large diameter portion 32b on the second thrust bearing portion T2 side. Otherwise, this example is of the same construction as the fluid dynamic bearing device 1 shown in FIG. 10, so a further description thereof will be omitted.

A fluid dynamic bearing device 41 shown in FIG. 16 mainly differs from the fluid dynamic bearing device 21 shown in FIG. 14 in that the sleeve portion 13 and the housing portion 29 (49) constituting the bearing member 27 are formed as separate components.

The sleeve portion 13 is formed of a metal such as brass or aluminum, or a porous material formed of sintered metal. In the fluid dynamic bring device 41, the sleeve portion 13 is formed of a porous material formed of a sintered metal whose main component is copper, and the outer peripheral surface 13d thereof is fixed to the inner peripheral surface 49a of the housing portion 49 by means such as bonding, press-fitting, or fusion bonding.

One or a plurality of axial grooves 32 are formed in the outer peripheral surface 13d so as to extend over the entire axial length thereof, and the fluid flow paths are formed by the axial grooves 32 and radial grooves 25c provided in the contact surface 25b1 of the cover member 25. In the fluid dynamic bearing device 41 shown, a plurality of (e.g., three) axial grooves 32 are formed at equal circumferential intervals, each axial groove 32 having a small diameter portion 32a on the first thrust bearing portion Ti, T2 side and a large diameter portion 32b communicating with the seal space S2.

The housing portion 49 is of a configuration as obtained by integrating with each other the seal portion 24 and the housing portion 29 shown in FIG. 14. Further, in this example, instead of the radial grooves 24b1 shown in FIG. 14, a circumferential groove 8c1 and radial grooves 13c2 are formed in the upper end surface 13c of the sleeve portion 13, where by communication is established between the upper end openings of the axial grooves 32 and the upper end of the radial bearing gap of the first radial bearing portion R1. Otherwise, this example is of the same construction as the fluid dynamic bearing device 21 shown in FIG. 14, so a further description thereof will be omitted.

A fluid dynamic bearing device 51 shown in FIG. 17 mainly differs from the fluid dynamic bearing device 21 shown in FIG. 14 in that the sleeve portion 13 and the housing portion 29 (59) constituting the bearing member 27 are formed as separate components, and in that the cover member 25 sealing the lower end of the bearing member 27 is formed integrally with the housing portion 59.

The housing portion 59 is formed as a so-called bottomed cylinder, using the cover member 25 as the bottom portion. A step is provided between the inner peripheral large diameter surface 59a of the housing 59 and the inner peripheral small diameter surface 59b provided at the lower end thereof, and a radial groove 25c is formed in the axial end surface 59c of this step. Further, although not shown, it is also possible to adopt a construction in which the inner peripheral surface of the housing 59 has a uniform diameter over the axial dimension, whereby the areas of the first and second thrust bearing surfaces 8b and 25a are enlarged outwardly. Otherwise, this example is of the same construction as the fluid dynamic bearing devices 21 and 41 shown in FIGS. 14 and 16, respectively, so a further description thereof will be omitted.

In all of these fluid dynamic bearing devices (the fluid dynamic bearing devices shown in FIGS. 15 through 17), the bearing member 7, 27 is provided with axial grooves 32 varying in sectional area (having the small diameter portion 32a and the large diameter portion 32b), whereby it is possible to attain the same effects as those of the fluid dynamic bearing devices 1 and 21 shown in FIGS. 10 and 14, respectively.

Further, while in the above-mentioned examples of the fluid dynamic bearing devices (fluid dynamic bearing devices shown in FIGS. 10 and 14 through 17), a dynamic pressure action of the lubricating oil is generated by dynamic pressure grooves of a herringbone-like configuration or a spiral configuration serving as the radial bearing portions R1 and R2 and the thrust bearing portions T1 and T2, the present invention is not restricted to this construction.

For example, it is possible to adopt, as the radial bearing portions RI and R2, so-called step-like dynamic pressure generating portions in which axial grooves are formed at a plurality of circumferential positions, or so-called multi-arc bearings (see FIGS. 7 and 8) in which a plurality of arcuate surfaces are arranged circumferentially and in which wedge-like radial gaps (bearing gaps) are formed between the arcuate surfaces and the outer peripheral surface 2a of the shaft 2a' opposed thereto.

Alternatively, it is also possible to form the inner peripheral surface 13a of the sleeve 13 constituting the radial bearing surface as a cylindrical inner peripheral surface having no dynamic pressure grooves, arcuate surfaces or the like as dynamic pressure generating portions, forming a so-called cylindrical bearing by this inner peripheral surface and the cylindrical outer peripheral surface 2a of the shaft 2a' opposed thereto.

Further, although not shown as well, it is also possible to form one or both of the thrust bearing portions Ti and T2 as a so-called step bearing or a corrugated bearing (with a corrugated step form) or the like in which dynamic pressure grooves in the form of a plurality of radial grooves are provided at predetermined circumferential intervals in the region constituting the thrust-bearing surface 13b, 14a, 25a.

Further, while in the examples described above the radial bearing surfaces are formed on the bearing member 7, 27 side, and the thrust bearing surface 13b, 14a, 25a is formed on the side of the bearing member 7, 27 or the cover member 25, it is also possible for the bearing surface where these dynamic pressure generating portions are formed to be provided, for example, on the shaft 2a' opposed thereto or on the flange portion 2b or the hub portion 15 side (rotation side).

The positions of the communication holes 12 constituting the fluid flow paths are not restricted to the ones shown in the drawings; they can be formed at arbitrary positions as long as the bearing member 7, 27 is open at both axial ends thereof. Further, in the case in which the fluid flow paths are formed by the communication holes 12 and the radial grooves 25c or by the axial grooves 32 and the radial grooves 25c, it is also possible to provide them on the opposing member side. For example, while in the fluid dynamic bearing devices shown in FIGS. 15 through 17 the axial grooves 32 are formed on the sleeve portion 13 side, it is also possible to form them on the housing portion 14, 49, 59 side. Alternatively, while in the fluid dynamic bearing devices shown in FIGS. 14, 16, and 17 the radial grooves 25c are formed on the cover member 25 or the housing 59 side, it is also possible to form them on the sleeve 13 side opposed thereto.

Further, while in the examples described above the fluid flow paths are formed by the communication holes 12 having the small diameter portions 12a and the large diameter portions 12b or by the axial grooves 32, the fluid flow paths are not restricted to the above-mentioned forms as long as they vary in flow path area in the axial direction. For example, it is possible to adopt a construction in which the communication holes 12 open on both axial sides of the bearing member 7 are

Figure 1:
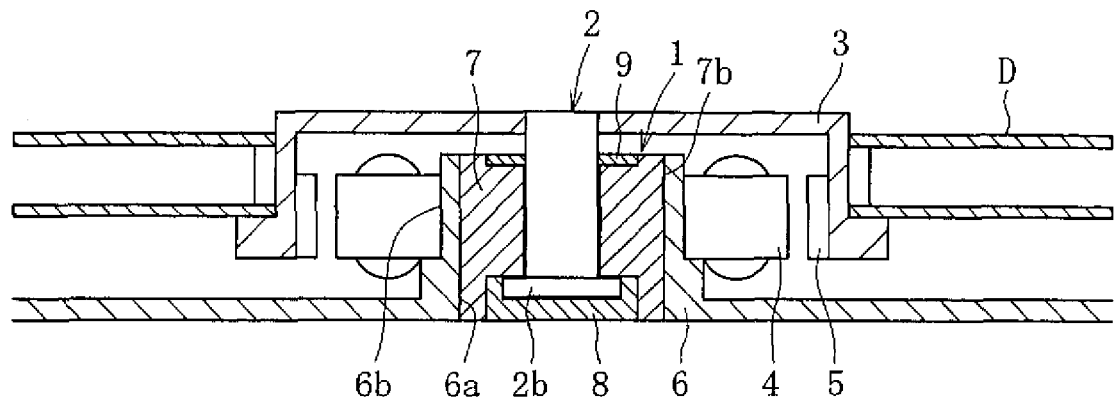
FIG. 1
A sectional view of an example of a motor into which a fluid dynamic bearing device is incorporated.
Figure 2:
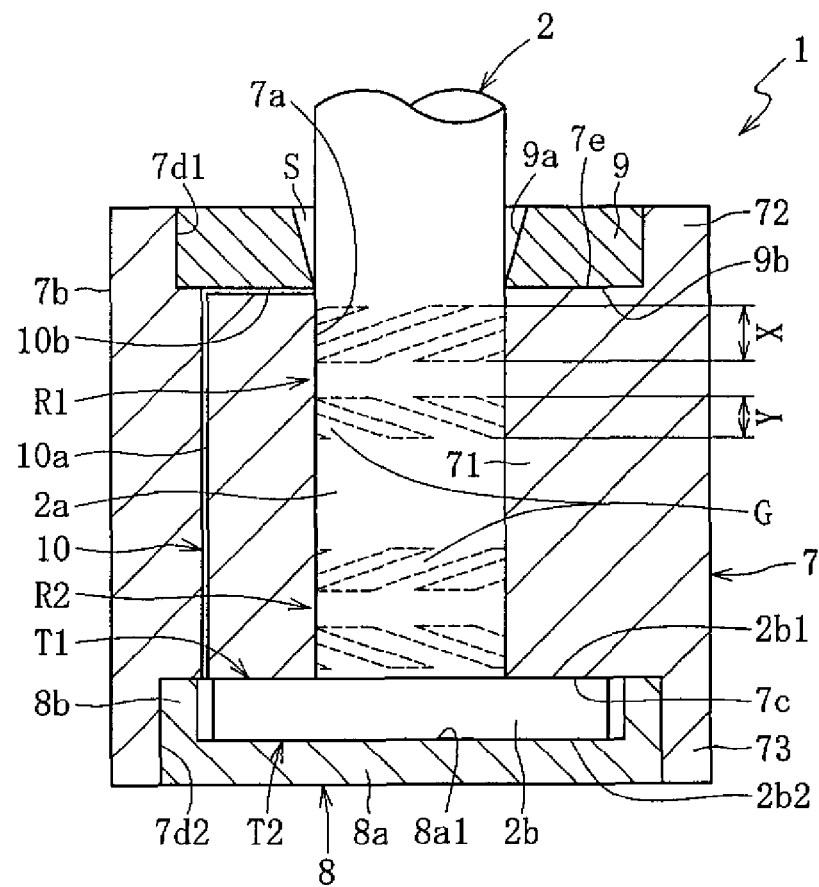
FIG. 2
A sectional view of a fluid dynamic bearing device.
Figure 3:
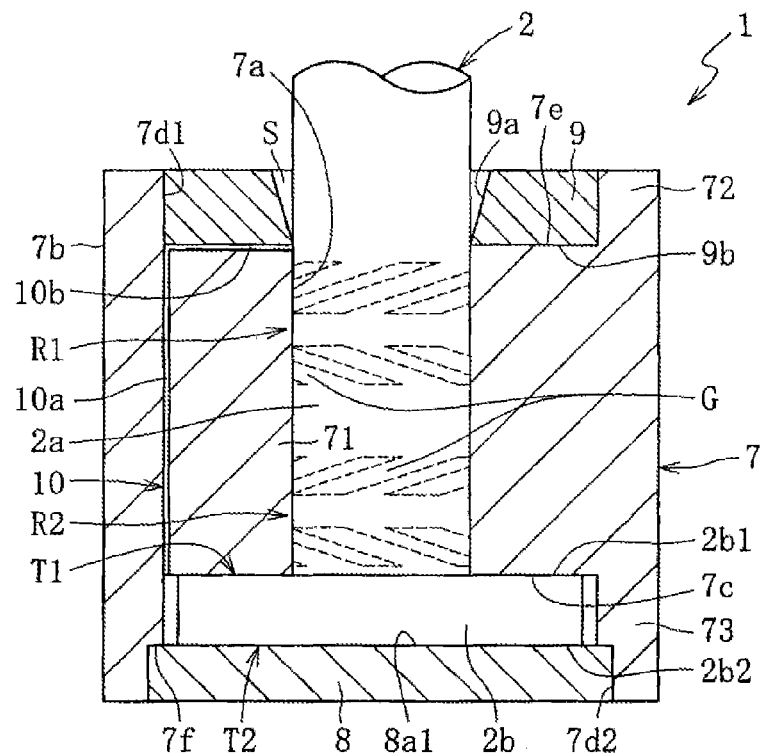
FIG. 3
A sectional view of a fluid dynamic bearing device.
Figure 4:
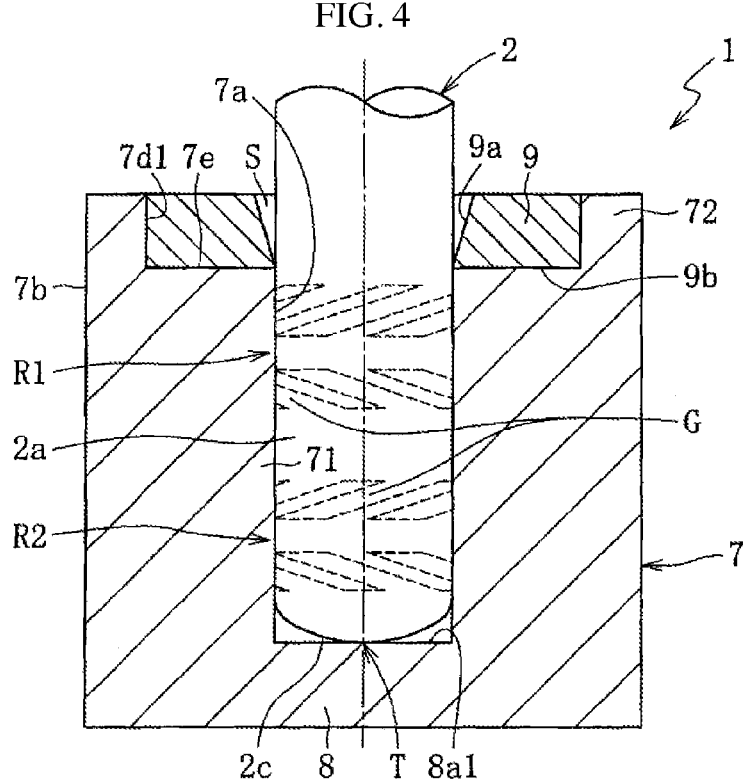
FIG. 4
A sectional view of a fluid dynamic bearing device.
Figure 5:
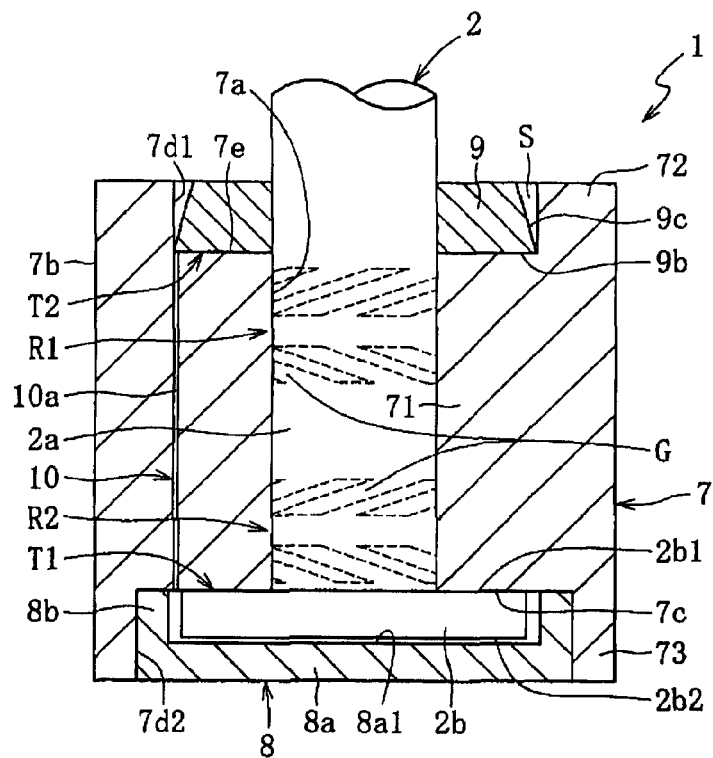
FIG. 5
A sectional view of a fluid dynamic bearing device.
Figure 6:
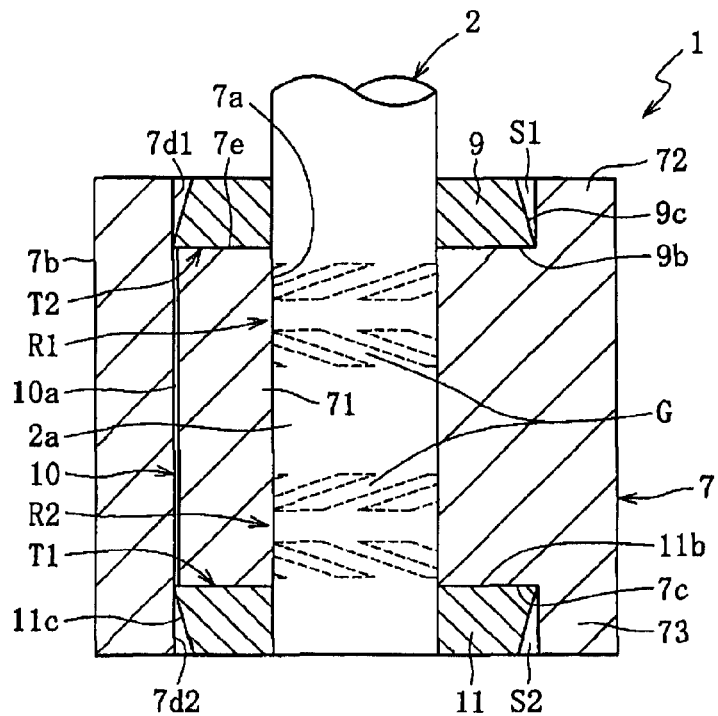
FIG. 6
A sectional view of a fluid dynamic bearing device.
Figure 7:
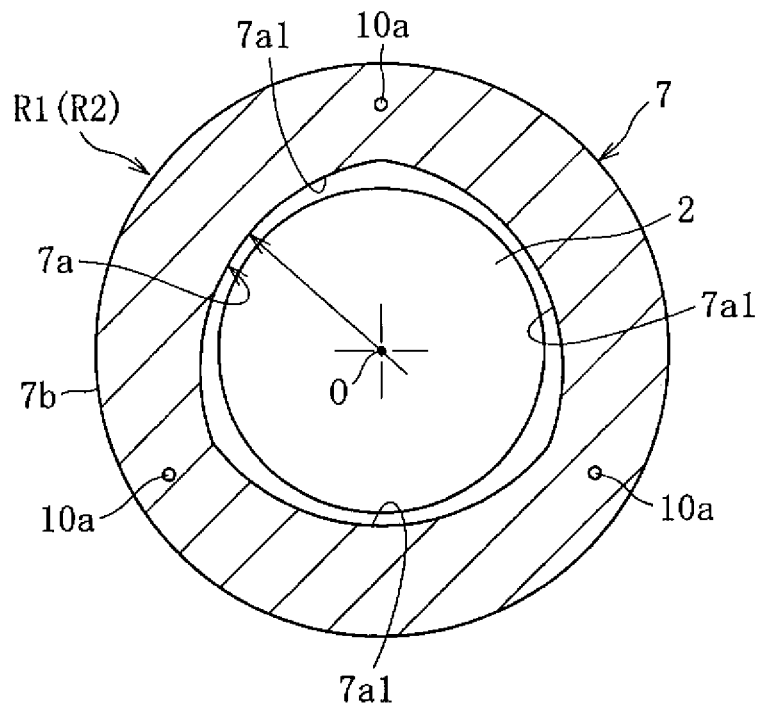
FIG. 7
A sectional view of another construction of the radial bearing portion.
Figure 8:
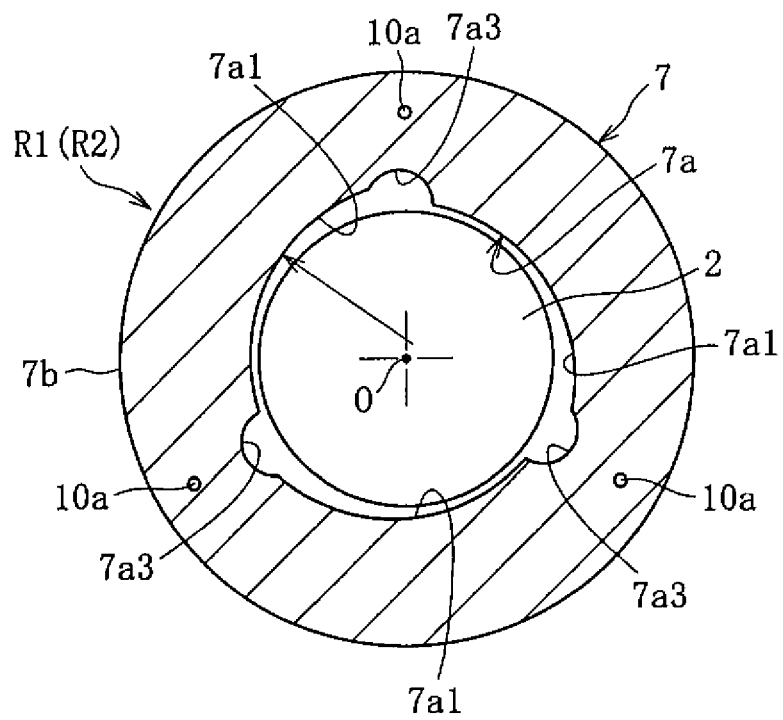
FIG. 8
A sectional view of another construction of the radial bearing portion.
Figure 9:
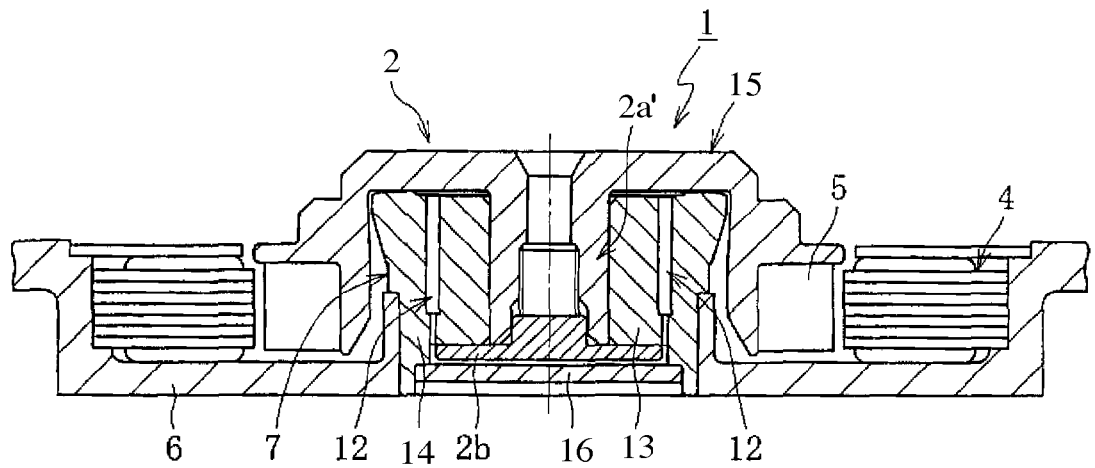
FIG. 9
A sectional view of a spindle motor into which a fluid dynamic bearing device is incorporated.
Figure 10:
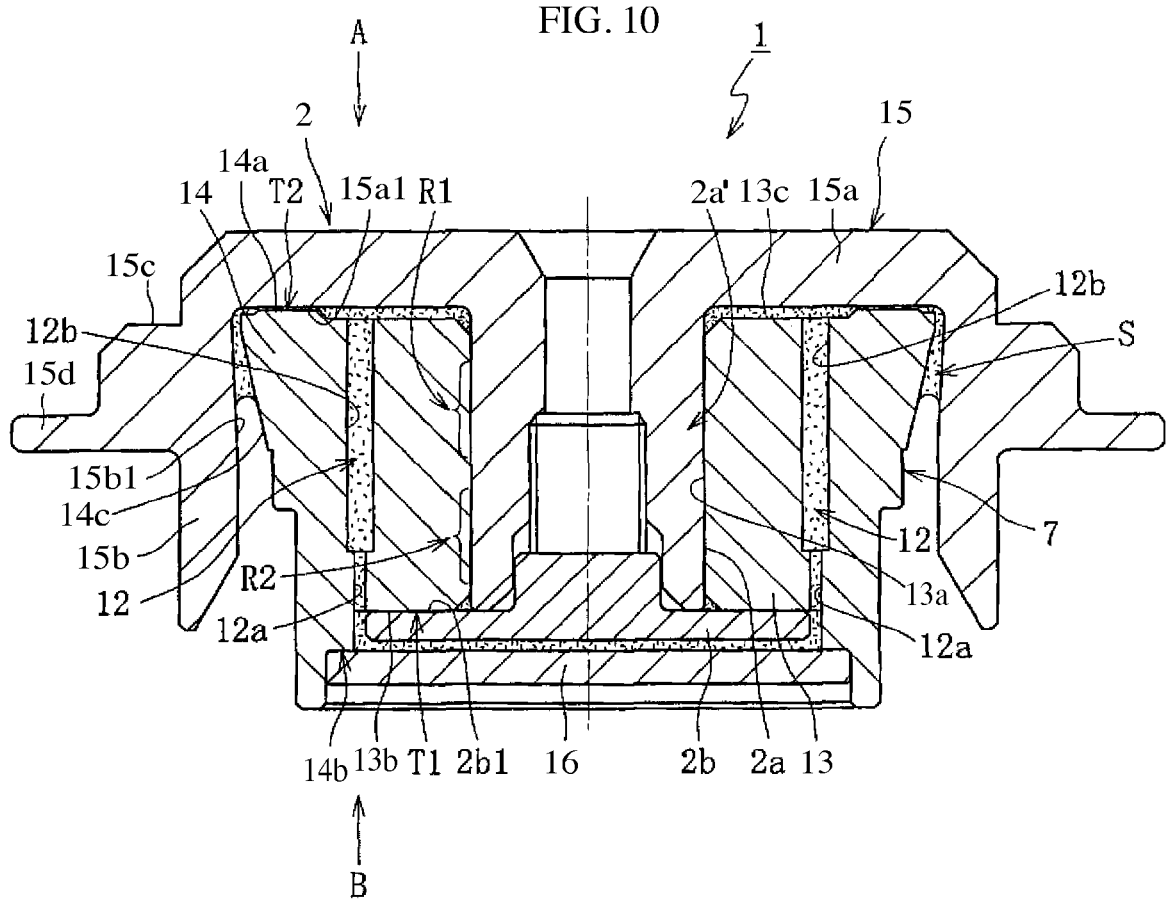
FIG. 10
A sectional view of a fluid dynamic bearing device.
Figure 11:
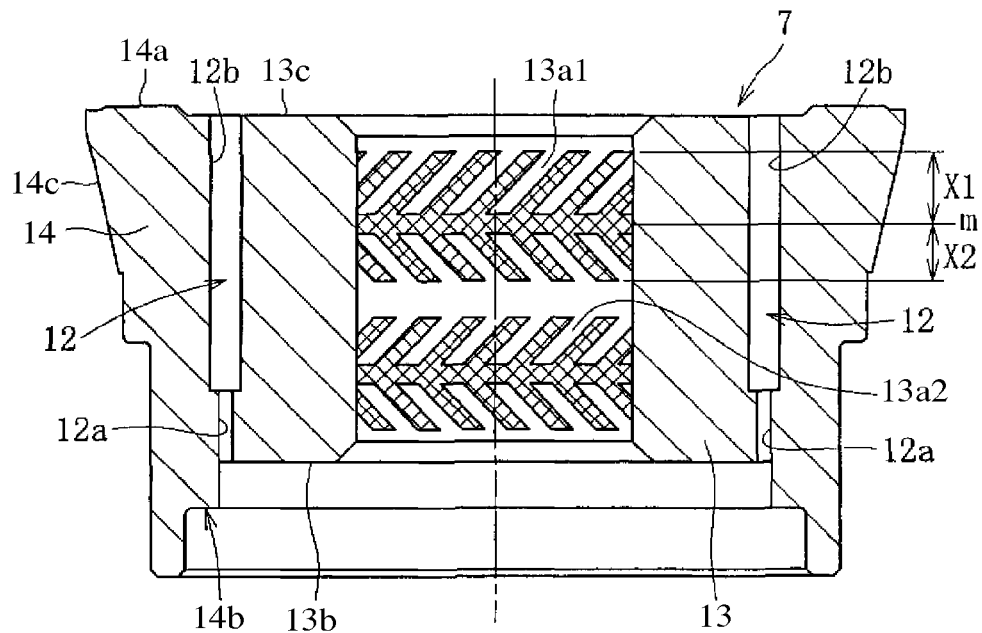
FIG. 11
A sectional view of a bearing member.
Figure 12:
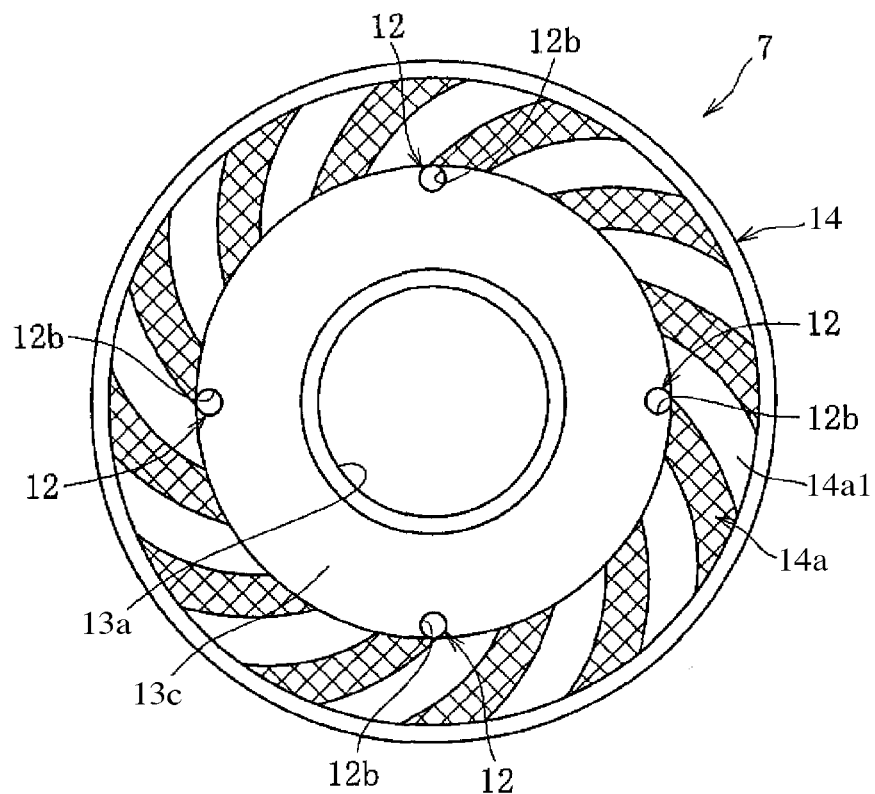
FIG. 12
A plan view of the bearing member as seen in the direction of the arrow A of FIG. 10.
Figure 13:
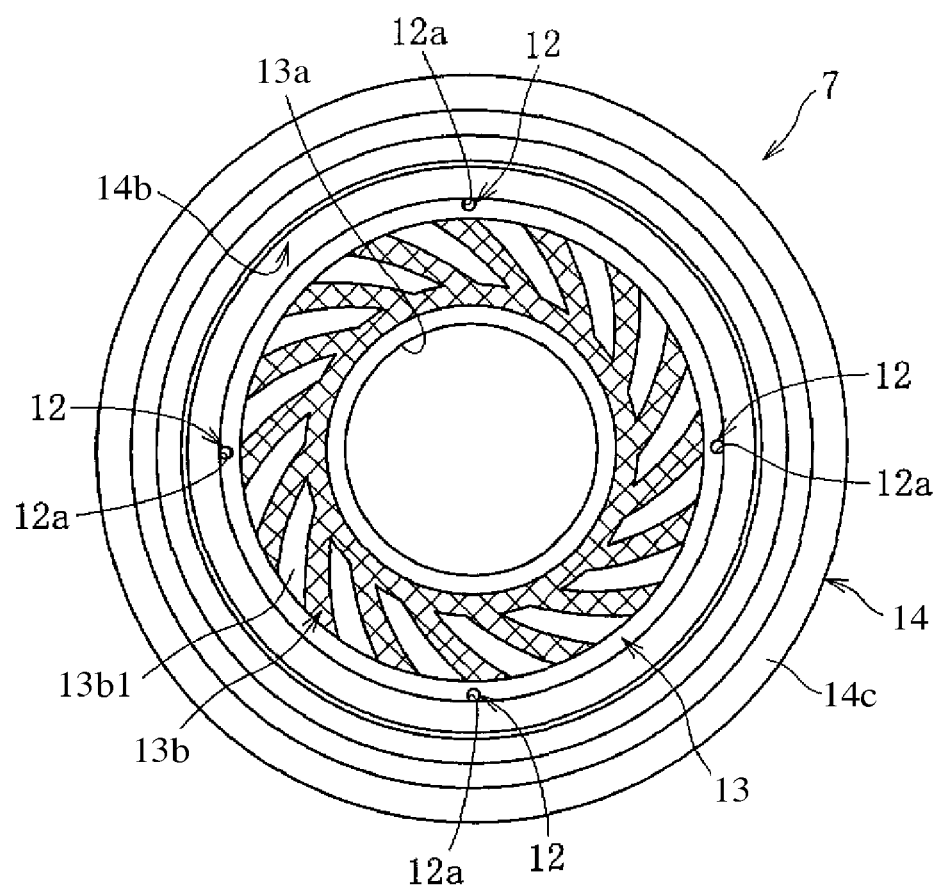
FIG. 13
A plan view of the bearing member as seen in the direction of the arrow B of FIG. 10.
Figure 14:
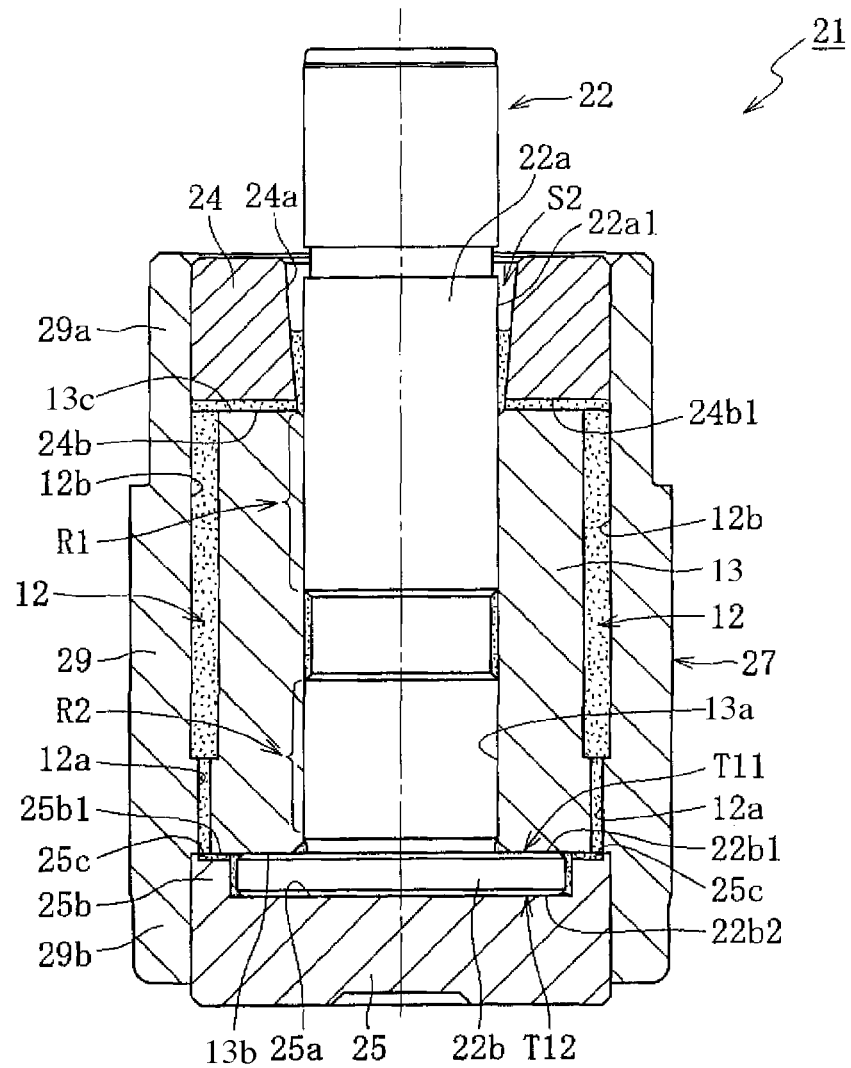
FIG. 14
A sectional view of a fluid dynamic bearing device.
Figure 15:
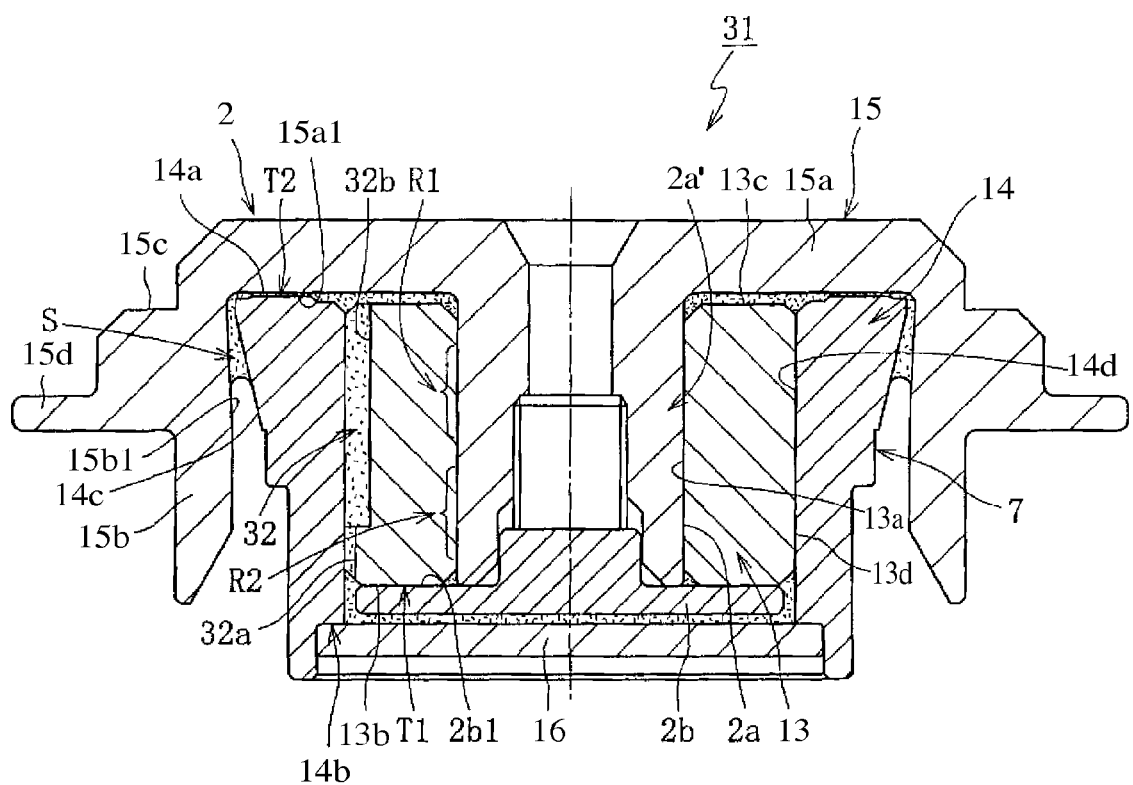
FIG. 15
A sectional view of a fluid dynamic bearing device.
Figure 16:
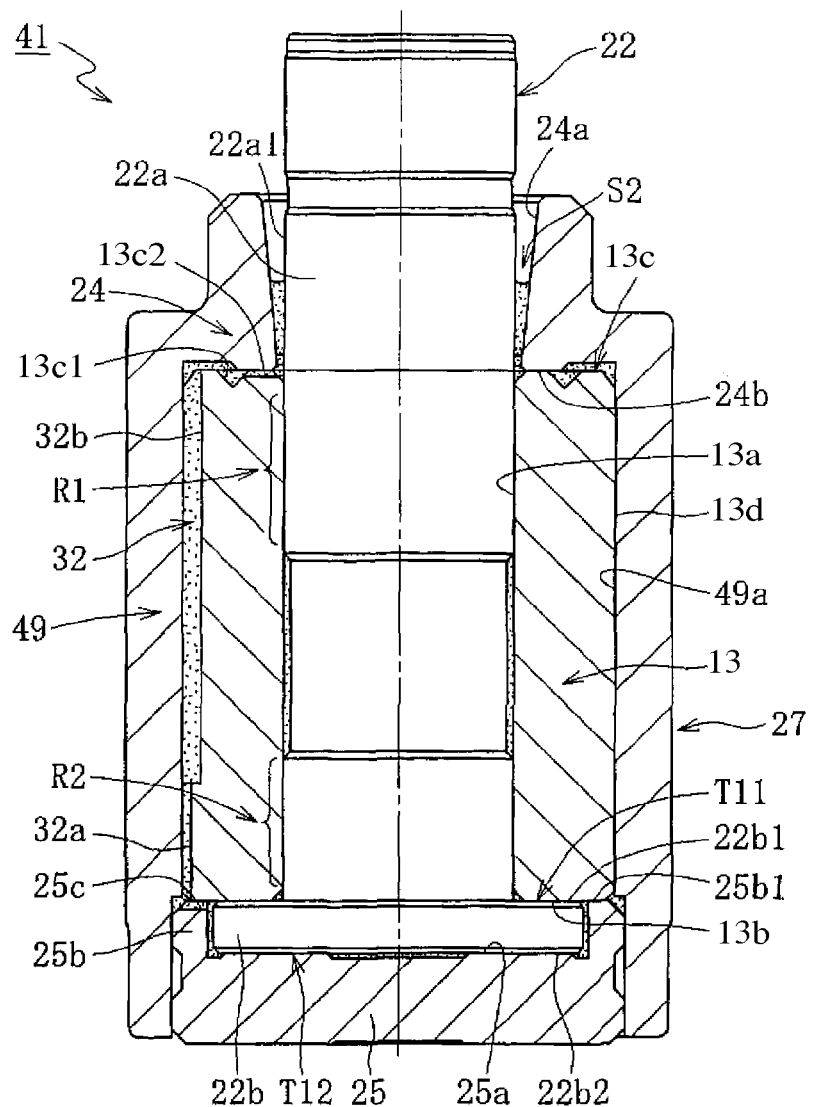
FIG. 16
A sectional view of a fluid dynamic bearing device.
Figure 17:
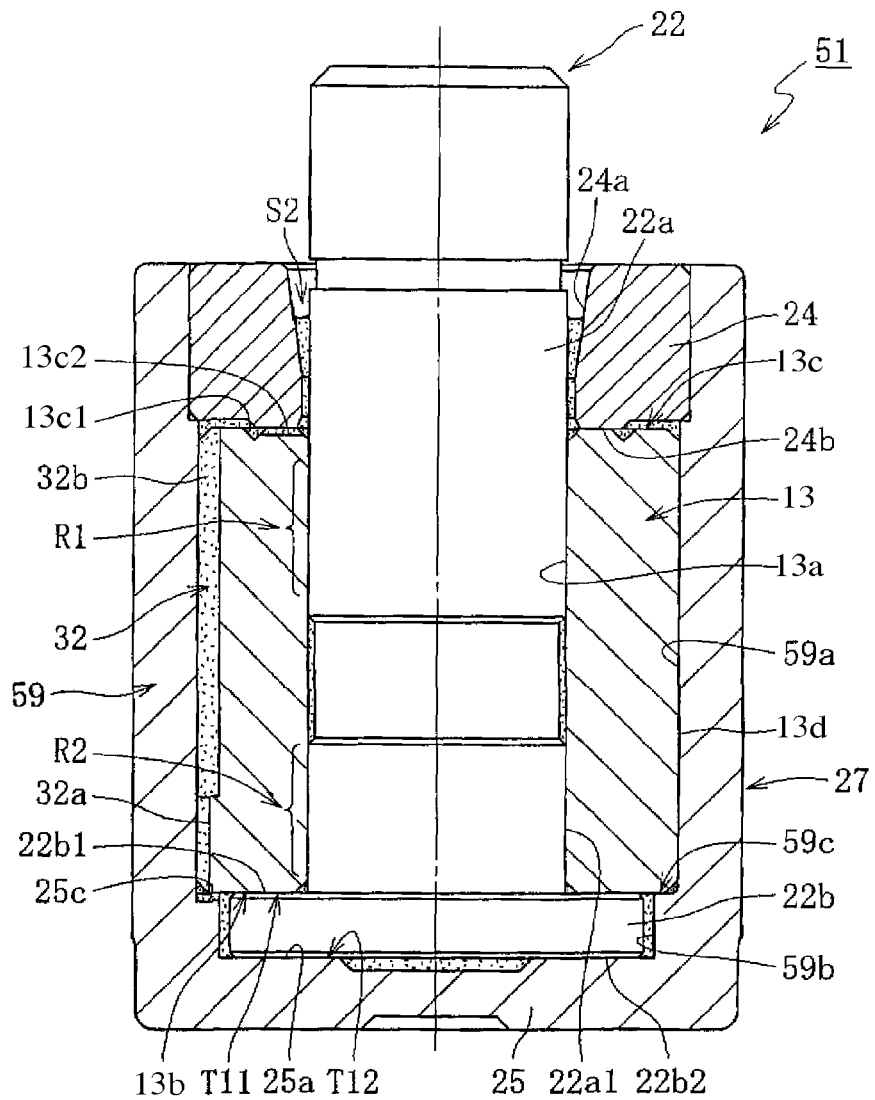
FIG. 17
A sectional view of a fluid dynamic bearing device.
Figure 18:
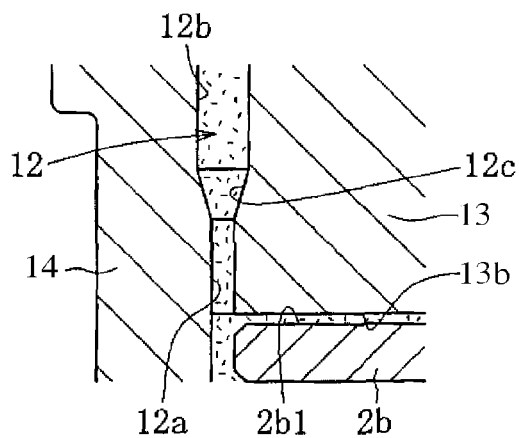
FIG. 18
A sectional view of another construction of the fluid flow path.
Figure 19:
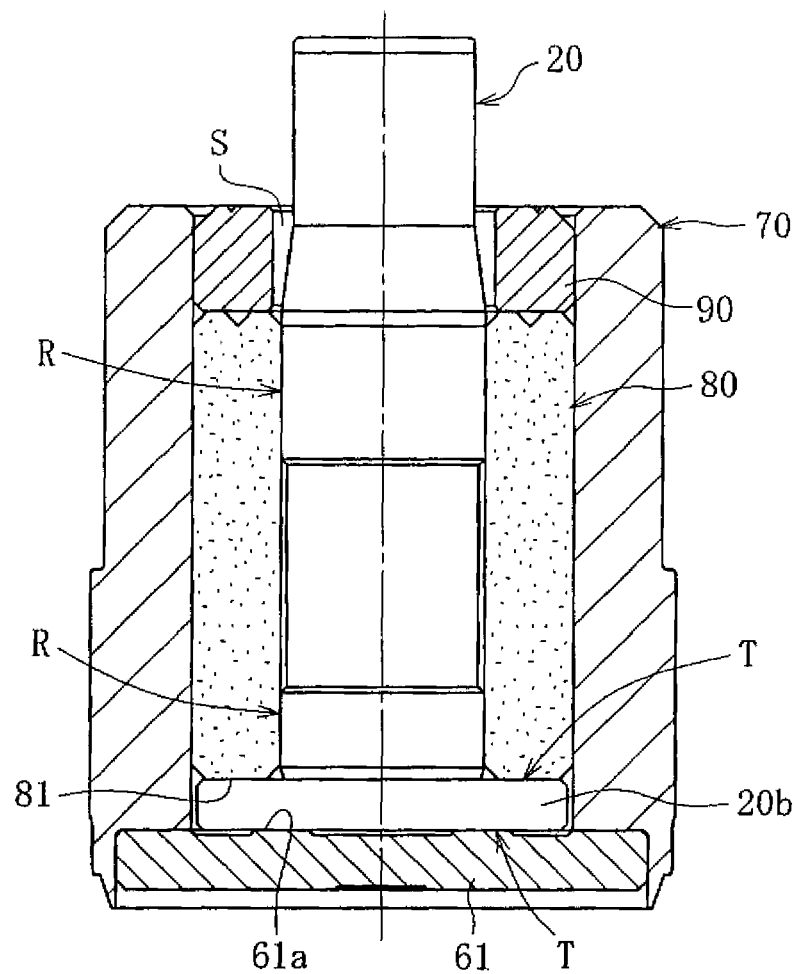
FIG. 19
A sectional view of an example of the construction of a conventional fluid dynamic bearing device.
[Description of Symbols]

The invention claimed is:

1. A fluid dynamic bearing device comprising:
a shaft member;
a bearing member in an inner periphery of which the shaft member is inserted, which has on an outer peripheral surface thereof a fixing surface for fixation to a bracket, which is formed as an integral member including a sleeve portion and protruding portions arranged on both sides in an axial direction of the sleeve portion and having inner peripheral surfaces with diameters larger than that of the inner peripheral surface of the sleeve portion, and which is open at both axial ends;
a cover member which is fixed to an inner periphery of one protruding portion;
a radial bearing portion radially supporting the shaft member by a dynamic pressure action of a lubricant fluid generated in a radial bearing gap between an outer peripheral surface of the shaft member and an inner peripheral surface of the sleeve portion;
a thrust bearing portion which comprises a thrust bearing gap facing an axial end surface of the sleeve portion, and which supports the shaft member in a thrust direction by a dynamic pressure action of a lubricant fluid generated in the thrust bearing gap;
a dynamic pressure generating portion which is formed by molding in the inner peripheral surface of the sleeve portion and which generates the dynamic pressure action of the lubricant fluid in the radial bearing gap;
a seal member arranged in an inner periphery of the other protruding portion and forming a seal space; and
a fluid flow path which has a portion open at both axial end surfaces of the sleeve portion of bearing member and through which the lubricant fluid flows between the thrust bearing gap of the thrust bearing portion and the seal space.

2. A fluid dynamic bearing device comprising:
a shaft member;
a bearing member which is formed as an integral member including a sleeve portion and a protruding portion formed at an axial end of the sleeve portion, in which a small diameter inner peripheral surface is formed at an inner periphery of the sleeve portion and a large diameter inner peripheral surface is formed at an inner periphery of the protruding portion, with the small diameter inner peripheral surface being opposed to an outer peripheral surface of the shaft member through an intermediation of a radial bearing gap, and which has on an outer peripheral surface thereof a fixing surface for fixation to a bracket;
a seal member which is provided with an outer peripheral surface fixed to the large diameter inner peripheral surface of the bearing member, an inner peripheral surface of which forms a seal space at an opening of the bearing member in cooperation with the outer peripheral surface of the shaft member, and which is in contact with an axial end surface of the sleeve potion of the bearing member;
a radial bearing portion radially supporting the shaft member by a dynamic pressure action of a lubricating oil generated in the radial bearing gap;
a thrust bearing portion supporting the shaft member in a thrust direction;
a fluid flow path extending axially which extends through the sleeve portion of the bearing member to open at the axial end surface of the sleeve portion; and
a fluid flow path extending radially which is formed between the axial end surface of the sleeve portion and an axial end surface of the seal member in contact with the axial end surface of the sleeve portion, one end of which opens to seal space and the other end of which connects with the fluid flow path extending axially,
an inner space of the bearing member sealed by the seal member which includes the fluid flow path extending axially and the fluid flow path extending radially is filed with the lubricating oil.

3. A fluid dynamic bearing device according to claim 1 or 2, wherein
an end surface of the bearing member and an end surface of the seal member can be axially engaged with each other.

4. A fluid dynamic bearing device according to claim 1 or 2, wherein the seal space is formed in an inner periphery of the seal member.

5. A fluid dynamic bearing device according to claim 1 or 2, wherein the seal space is formed in an outer periphery of the seal member.

6. A fluid dynamic bearing device according to claim 1 or 2, wherein the bearing member is provided with a fluid flow path which is open at both axial ends thereof and capable of circulating the fluid between the ends of a gap including the radial bearing gap between the outer peripheral surface of the shaft member and the inner peripheral surface of the bearing member, and
wherein the fluid flow path axially varies in flow path area.

7. A fluid dynamic bearing device according to claim 6, wherein the fluid flow path is provided with a first flow path portion whose flow path area is small and a second flow path portion whose flow path area is larger than that of the first flow path portion.

8. A fluid dynamic hearing device according to claim 1 or 2, further comprising a first thrust bearing portion rotatably supporting in the thrust direction one of the shaft member and the bearing member through an intermediation of a fluid film formed in the thrust bearing gap, wherein the first thrust bearing portion is provided with a first dynamic pressure generating portion generating a dynamic pressure action of the fluid in the thrust bearing gap thereof.

9. A fluid dynamic bearing device according to claim 8, further comprising a second thrust bearing portion rotatably supporting in the thrust direction one of the shaft member and the bearing member through the intermediation of a fluid film formed in the thrust bearing gap(wherein the second thrust bearing portion is provided with a second dynamic pressure generating portion generating a dynamic pressure action of the fluid in the thrust bearing gap thereof.

10. A fluid dynamic bearing device according to claim 9, further comprising a second flow path portion open on the inner side of the second dynamic pressure generating portion.

11. A fluid dynamic bearing device according to claim 1 or 2, wherein the bearing member is an integral molding of a resin or metal.

12. A motor comprising:
a dynamic bearing device according to claim 1 or 2;
a stator coil; and
a rotor magnet.

* * * * *